(12) United States Patent
Muramatsu et al.

(10) Patent No.: US 7,432,429 B2
(45) Date of Patent: Oct. 7, 2008

(54) PEDALING AID FOR HANDICAPPED MUSICIAN

(75) Inventors: Shigeru Muramatsu, Hamamatsu (JP); Yasuhiko Ohba, Hamamatsu (JP); Hiroyuki Murakami, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 133 days.

(21) Appl. No.: 11/261,528

(22) Filed: Oct. 27, 2005

(65) Prior Publication Data
US 2006/0112809 A1 Jun. 1, 2006

(30) Foreign Application Priority Data
Nov. 30, 2004 (JP) ............................. 2004-347061
Nov. 30, 2004 (JP) ............................. 2004-347062

(51) Int. Cl.
*G10D 3/00* (2006.01)
*G10C 3/26* (2006.01)

(52) U.S. Cl. ..................... 84/453; 340/825.19; 84/231

(58) Field of Classification Search ................... 84/743, 84/225, 229, 230, 231, 453, 105, 106, 107, 84/108, 109, 110, 111, 112, 113, 114, 357, 84/358, 746, 737, 738, 739, 740, 741; 340/825.19
See application file for complete search history.

(56) References Cited

U.S. PATENT DOCUMENTS 3,946,174 A * 3/1976 Herbst ...................... 200/81.4
4,018,128 A * 4/1977 Megee ......................... 84/231
4,093,037 A * 6/1978 Miller, III .................... 180/316
4,117,863 A * 10/1978 Gabus ..................... 137/601.03
4,736,664 A * 4/1988 Hinsley et al. ............... 84/231
5,523,522 A * 6/1996 Koseki et al. ................. 84/21

FOREIGN PATENT DOCUMENTS

JP      53-150143      11/1978
JP      3331055        7/2002

OTHER PUBLICATIONS

Rose, Damon. "Don't call me handicapped!" BBC News, Oct. 4, 2004. <http://news.bbc.co.uk/2/hi/uk_news/magazine/3708576.stm>.*

* cited by examiner

*Primary Examiner*—Lincoln Donovan
*Assistant Examiner*—Andrew R Millikin
(74) *Attorney, Agent, or Firm*—Morrison & Foerster LLP

(57) ABSTRACT

A pedaling aid is combined with an acoustic piano, and assists a physically handicapped person in performing a piece of music on the acoustic piano; the pedaling aid includes a human interface, a pedal actuator and a controller, and the pedal actuator is equipped with a locator and a coupling device; a user moves the pedal actuator in the vicinity of the acoustic piano, and couples the pedal actuator to the acoustic piano at a proper position with the assistance of the locator and coupling device; while the physically handicapped person is fingering on the acoustic piano, the human interface is kept around the head so that the physically handicapped person manipulates the human interface with the chin, mouth, teeth or tongue; since the human interface produces a signal representative of a target position, the controller makes the pedal actuator to move the pedal to the target position.

9 Claims, 18 Drawing Sheets

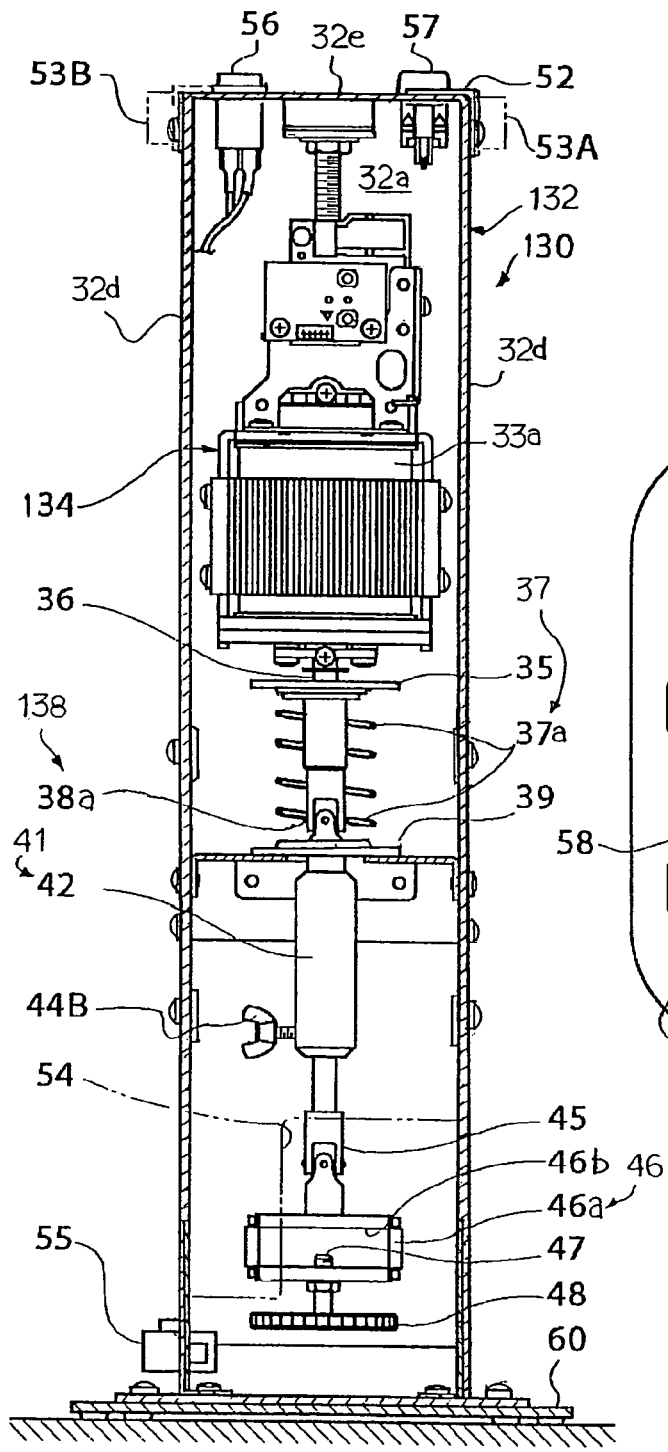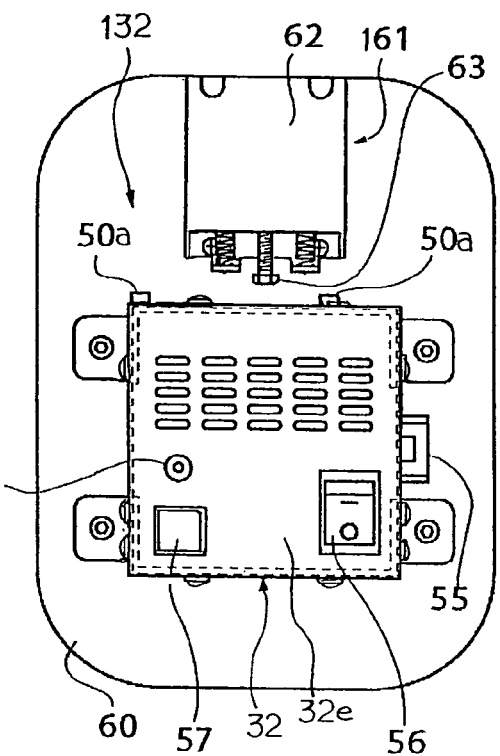
Fig. 1 4
Fig. 1 5

PEDALING AID FOR HANDICAPPED MUSICIAN

FIELD OF THE INVENTION

This invention relates to an aid for handicapped musicians and, more particularly, to a pedaling aid for handicapped musicians which is, by way of example, used in a practice or a performance on a piano.

DESCRIPTION OF THE RELATED ART

Musical instruments are usually designed on the assumption that non-handicapped persons will play pieces of music on the musical instruments. However, many physically handicapped persons wish to play pieces of music on the musical instruments. Several sorts of aids are required for these physically handicapped persons. It is possible for a person who has lost the use of his or her legs to practice the fingering on a keyboard of a piano. However, he or she feels it difficult to practice the pedaling on the pedals of the piano. If a suitable pedaling aid assists him or her, the physically handicapped person can play a piece of music on the piano.

Some pedaling aids have been proposed for the physically handicapped persons. An example of the prior art pedaling aid is disclosed in Japanese Utility Model application laid-open No. Sho 53-150143. The prior art pedaling aid disclosed in the Japanese Utility Model application laid-open is hereinafter referred to as the "first prior art pedaling aid". The first prior art pedaling aid is constituted by three electromagnetic pedal actuators, three switches and a controller. The electromagnetic pedal actuators are respectively provided under the three pedals of the acoustic piano, i.e., the damper, soft and sostenuto pedals, and the three switches are provided on the back of the chair. The three switches are respectively associated with the damper pedal, soft pedal and sostenuto pedal, respectively.

A physically handicapped person sits on the chair, and keeps his back spaced from the switches on the back of the chair. When the physically handicapped person wishes to prolong the tones in his or her performance, he or she pushes the associated switch with his or her back so that the switch turns on. The controller energizes the electromagnetic pedal actuator with electric current, and the damper pedal is attracted toward the energized electromagnetic pedal actuator. This results in that the damper pedal keeps the dampers spaced from the strings. As a result, the tones are prolonged. The other switches and associated electromagnetic pedal actuators behave similar to those for the damper pedal.

Another example of the pedaling aid is disclosed in Japanese Patent No. 3331055. The prior art pedaling aid disclosed in the Japanese Patent is hereinafter referred to as the "second prior art pedaling aid". The second prior art pedaling aid includes a pad, which is on a level with the key bed, and a linkwork connected between the pad and the pedal linkage of the damper pedal. When a physically handicapped person wishes to prolong the tones, he or she brings his or her abdomen into contact with the pad, and pushes the pad. The force, which the physically handicapped person exerts on the pad, is transmitted through the linkwork to the pedal linkage of the damper pedal, and gives rise to the action as if he or she steps on the damper pedal. As a result, the dampers keeps themselves spaced from the strings.

A problem inherent in the first prior art pedaling aid is that the pedals are simply changed between the pedal-on state and the pedal-off state. When the physically handicapped person exerts the force on the switch, the switch turns on, and the associated pedal is moved from the rest position to the end position. On the other hand, when he or she removes the force from the switch, the pedal returns from the end position to the rest position. This is because of the fact that the switches are bi-stable. However, pianists sometimes keep the pedal at an intermediate position on the way to the end position. The pedaling is referred to as "half pedal". When the dampers start to reduce the pressure to the strings, the pedal enters the half pedal state. When all the dampers are spaced from the strings, the pedal exits from the half pedal state.

When a pianist brings the damper pedal into the half pedal, the dampers are softly brought into contact with the strings, and the dampers make the tones softer than those in the pedal-on state. The half pedal is the third state, and the first prior art pedaling aid can not discriminate player's intention from the two sorts of pedal state. As a result, the first prior art pedaling aid is merely used for the beginners.

A problem is encountered in the second prior art pedaling aid in that the users hardly install the second prior art pedaling aid in the piano. In the second prior art pedaling aid, the force is transmitted from the pad through the linkwork to the linkage of the damper pedal. The mechanical parts are movably connected to the key bed. Such an assembling work is too difficult to be exactly carried out by the users. The users would require the assistance of workers for the installation. Thus, the installation is not easy for the users. Moreover, it is hard to separate the second prior art pedaling aid from the acoustic piano after the installation. Although the physically handicapped persons appreciate the second prior art pedaling aid, the second prior art pedaling aid, especially, the pad and the arm connected thereto are obstacle to the non-handicapped users. Even if the non-handicapped persons wants to remove the second prior art pedaling aid from the acoustic piano, the disassembling work is also not easy, and the assistance of workers is required for the disassembling work.

Another problem is inherent in both first and second prior art pedaling aids. The problem is encountered in that the physically handicapped persons are liable to fall down the chair. As described hereinbefore, the physically handicapped person pushes the switches with his or her back in the first prior art pedaling aid for imparting the artificial expression, and pushes the pad with his or her abdomen for prolonging the tones. When the physically handicapped person impart the artificial expression to the tones or prolongs the tones, he or she inclines toward the switch or pad, and, thereafter, presses his or her back or abdomen to the switch or pad in the direction to turn on the switch or to rotate the arm. If his or her legs were well workable, he or she would keep his or her body on the chair against the inclination. However, he or she has lost the use of his or her legs. The physically handicapped persons sometimes fall down the chair. Thus, the first and second prior art pedaling aids are sometimes dangerous for the physically handicapped persons who have lost the use of their legs.

SUMMARY OF THE INVENTION

It is therefore an important object of the present invention to provide a pedaling aid, which brings pedals into more than two stable positions.

It is also an important object of the present invention to provide a pedaling aid, which makes a physically handicapped person perform a piece of music on a musical instrument in safe.

It is another important object of the present invention to provide a pedaling aid, which makes the assembling/disassembling work easy.

In accordance with one aspect of the present invention, there is provided a pedaling aid for a physically handicapped musician comprising a pedal actuator associated with a pedal of a musical instrument and responsive to a driving signal so as to drive the pedal to move between a rest position and an end position, a human interface manipulated by the physically handicapped musician with an organ of the body of the physically handicapped musician except those of the trunk of the body for producing an input signal representative of an intention of the musically handicapped musician, and a controller connected to the pedal actuator and the human interface, and responsive to the input signal so as to produce the driving signal.

In accordance with another aspect of the present invention, there is provided a pedaling aid for a physically handicapped musician comprising a pedal actuator associated with a pedal of a musical instrument and responsive to a driving signal so as to drive the pedal to move over a target pedal stroke on a trajectory between a rest position and an end position, a human interface manipulated by the physically handicapped musician for producing an input signal representative of the target pedal stroke, and a controller connected to the pedal actuator and the human interface, responsive to the input signal so as to determine the target pedal stroke on the basis of the input signal and adjusting the driving signal to a magnitude equivalent to the target pedal stroke.

In accordance with yet another aspect of the present invention, there is provided a pedaling aid for a physically handicapped musician comprising a pedal actuator associated with a pedal of a musical instrument and including an actuator responsive to a driving signal so as to drive the pedal to move between a rest position and an end position, a supporting frame for bearing the actuator and a coupling device for keeping the supporting frame at a proper position with respect to the musical instrument, a human interface manipulated by the physically handicapped musician for producing an input signal representative of an intention of the musically handicapped musician, and a controller connected to the pedal actuator and the human interface and responsive to the input signal so as to produce the driving signal.

BRIEF DESCRIPTION OF THE DRAWINGS

The features and advantages of the pedaling aid will be more clearly understood from the following description taken in conjunction with the accompanying drawings, in which FIG. 14 is a cross sectional back view showing the structure of the pedal actuator, FIG. 15 is a plane view showing the pedal actuator.

DESCRIPTION OF THE PREFERRED EMBODIMENTS

Figure 1:
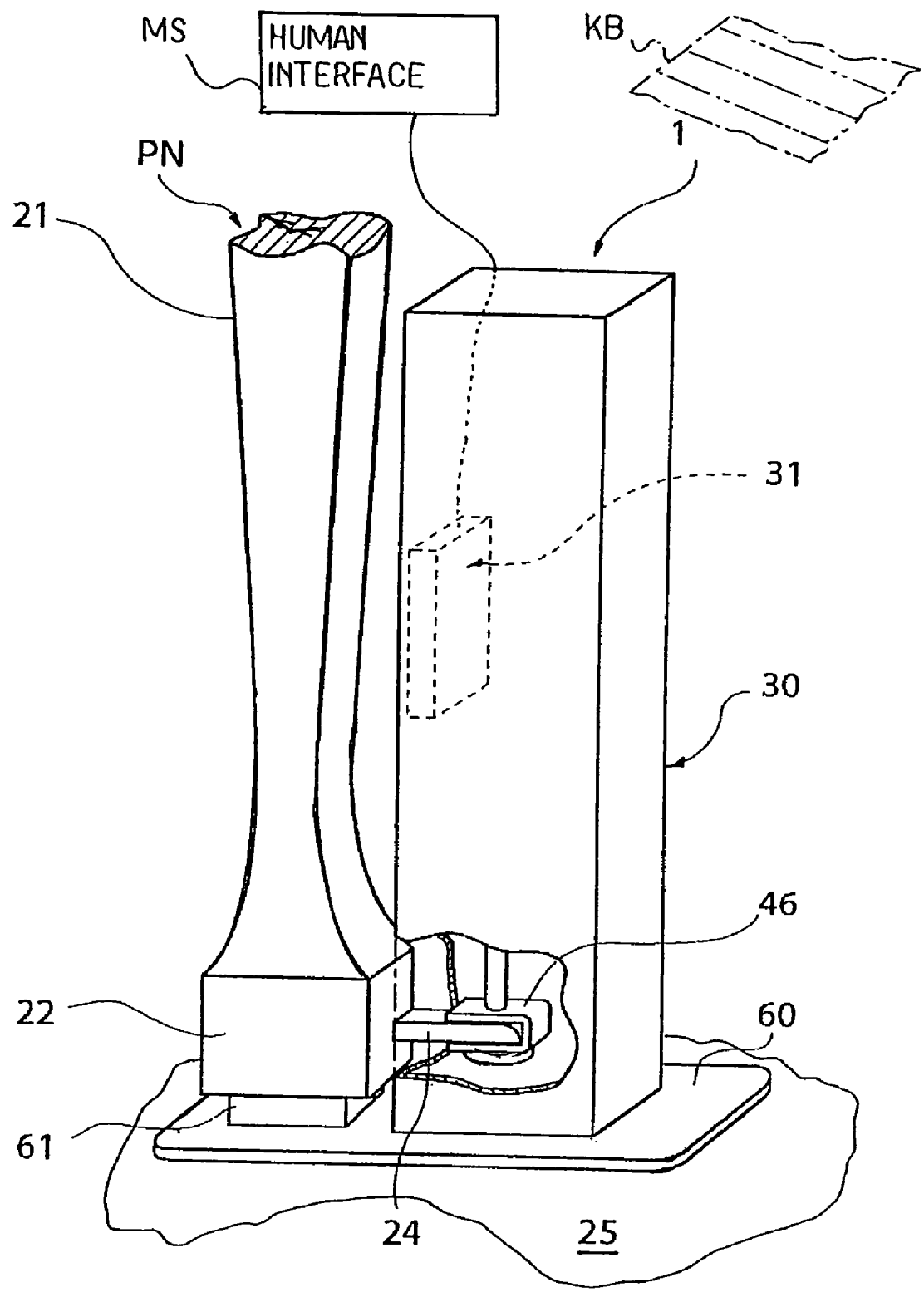
FIG. 1 is a partially cut-away perspective view showing a pedaling aid assembled with a pedal of an acoustic piano.

A pedaling aid according to the present invention makes it possible to perform a musical instrument by a physically handicapped person who has lost the use of his or her legs.

The pedaling aid largely comprises a human interface, a controller and a pedal actuator. The controller is connected to the human interface, and the physically handicapped person instructs the controller to carry out the pedaling instead of his or her legs through the human interface. The pedal actuator is provided in the vicinity of a pedal of the musical instrument, and moves the pedal under the control of the controller.

The human interface is located at a proper position close to his or her head, shoulder, arm or elbow so that the physically handicapped person can manipulate the human interface without inclination of the trunk of his or her body on a chair. For this reason, the physically handicapped person does not lose his or her balance on the chair. In other words, the physically handicapped person is less liable to fall down the chair.

When the physically handicapped person manipulates the human interface, the human interface produces a signal representative of pieces of intention data, and supplies the signal to the controller. The pieces of intention data express not only activation of a pedal but also a target position on the pedal trajectory or pedal stroke. The potential level of the signal may express the target pedal position or pedal stroke. Otherwise, the time period during which the human interface is continuously manipulated or the number of the switching actions express the target pedal position.

When the signal reaches the controller, the controller analyzes the pieces of intention data, and determines the magnitude of a driving signal. The driving signal is supplied from the controller to the pedal actuator so that the pedal actuator forces the pedal to travel on the trajectory. When the pedal reaches the target pedal position, the controller reduces the magnitude of the driving signal so as to keep the pedal at the target pedal position. As a result, the musical instrument imparts a predetermined effect to the tone or tones.

When the physically handicapped person wishes to remove the effect from tones, he or she manipulates the human interface so as to produce the pieces of intention data expressing a new target pedal position at which the effect is removed from the tones. The controller analyzes the pieces of intention data, and causes the pedal actuator to move the pedal to the new target position. For this reason, the musical instrument does not impart the effect to the tones.

As will be understood, the physically handicapped person can specify the target pedal position on the trajectory. If the musical instrument selectively imparts different effects to the tones depending upon the pedal position on the trajectory, the physically handicapped person can selectively give the effects by manipulating the human interface.

The pedal actuator includes an actuator unit and a coupling device. The actuator unit is responsive to the driving signal so as to give rise to the motion of the pedal along the trajectory. The coupling device is provided in association with the actuator unit, and keeps the actuator unit at a proper position with respect to the musical instrument. The actuator unit can move the pedal at the proper position so that the pedaling aid is combinable with another musical instrument. Thus, the pedaling aid of the present invention is easily assembled with and disassembled from a musical instrument.

In the following description, term "front" is indicative of a position closer to a player, who sits on a stool for fingering, than a position modified with term "rear". A line drawn between the front position and a corresponding position extends in a "fore-and-aft direction", and the fore-and-aft direction crosses a lateral direction at ring angle. A vertical line is normal to a plane defined by lines extending in the fore-and-aft direction and lateral direction. Term "head" is indicative of the part of a human body higher than the neck, and contains the organs on the face such as the lip, mouth and tongue. The "right" and "left" are determined on the assumption that the inventor is confronted with the front surface of the pedaling aid.

First Embodiment

Figure 2:
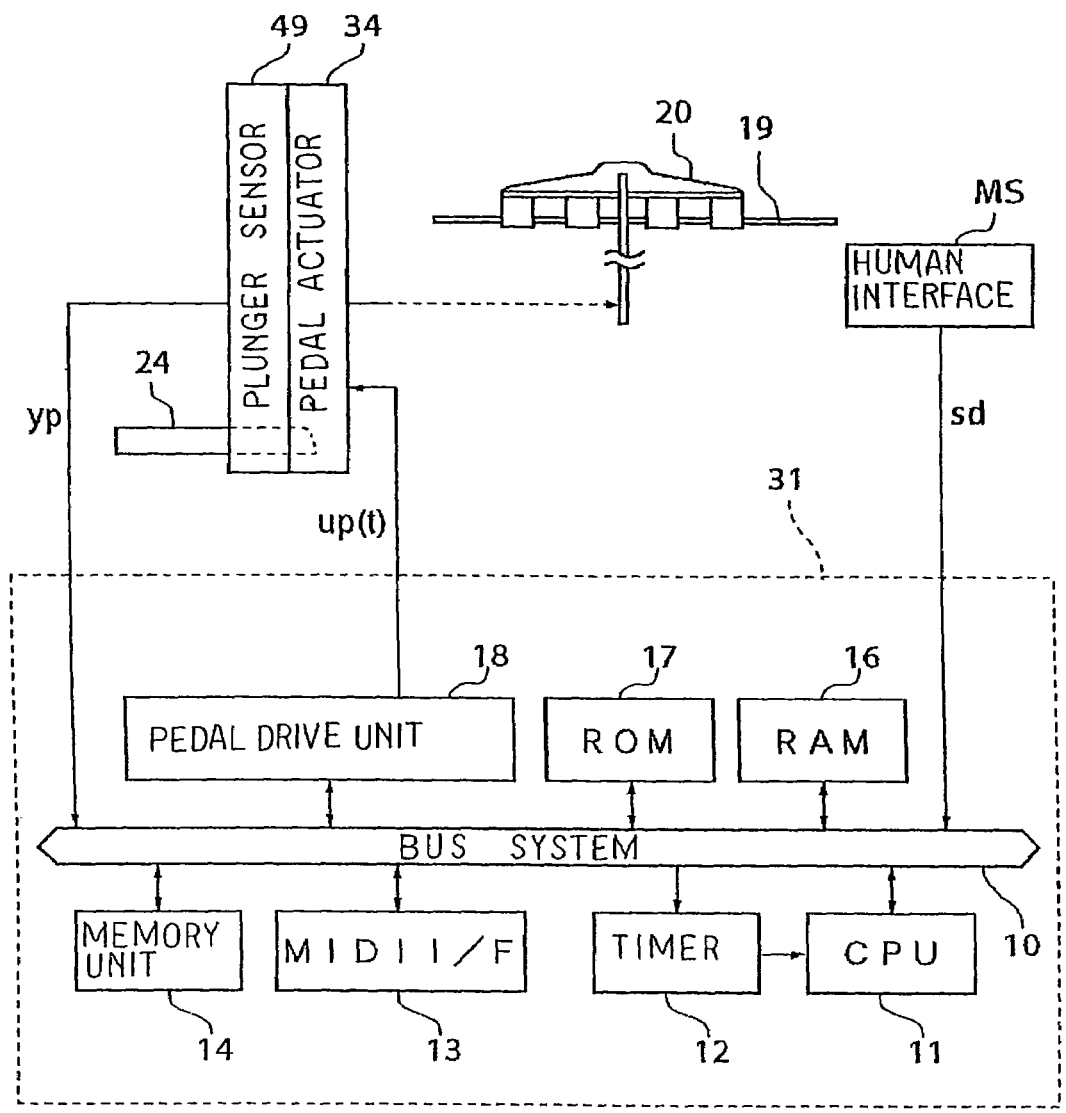
FIG. 2 is a block diagram showing the system configuration of a controller incorporated in the pedaling aid.

Referring first to FIGS. 1 and 2 of the drawings, a pedaling aid 1 embodying the present invention is installed in the vicinity of a keyboard musical instrument, and largely comprises at least one pedal actuator 30, a controller 31 and a human interface MS. The keyboard musical instrument is a grand piano PN, and a piano cabinet (not shown), strings 19, dampers 20 (see FIG. 2), a keyboard KB, action units (not shown) and a damper pedal 24 are incorporated in the grand piano PN. The keyboard KB is mounted on a front portion of the piano cabinet (not shown), and the action units (not shown), hammers (not shown), strings 19 and dampers 20 are accommodated in the piano cabinet (not shown).

The keyboard KB includes white keys and black keys, which are laid on the well known pattern, and the black keys and white keys are linked with the dampers 20 and action units (not shown) so that the musician can selectively actuates the dampers 20 and action units (not shown) through the fingering on the keyboard KB. The action units (not shown) are linked with the hammers (not shown), and the dampers 20 are spaced from and brought into contact with the associated strings 19. The hammers (not shown) are provided under the strings 19, and are driven for rotation by means of the actuated action units (not shown). The hammers (not shown) are brought into collision with the strings 10 at the end of the rotation, and give rise to the vibrations of the associated strings 19.

A lyre post 21 downwardly projects from the bottom of the piano cabinet (not shown), and a pedal box 22 is secured to the lower end of the lyre post 21. The damper pedal 24 forwardly projects from the pedal box 22. Although the grand piano PN further has a soft pedal and a sostenuto pedal, these pedals are not illustrated for the sake of simplicity. The damper pedal 24 is connected to a linkage 24a, and the linkage 24a upwardly extends from the pedal box 22 at the back of the lyre post 21. The linkage 24a is connected to a lifting rail (not shown), which makes the dampers 20 concurrently spaced from the strings 19. Thus, the structure of the grand piano PN is same as that well known to persons skilled in the art.

A physically handicapped person, who wishes to play a pieced of music on the acoustic piano PN, fingers a piece of music on the keyboard KB for producing piano tones, and sometimes moves the damper pedal 24 to any position on the trajectory between a rest position and an end position by means of the pedaling aid 1 for prolonging the piano tones. Since the pedaling aid 1 can move the damper pedal 24 to not only the end position but also a half pedal position, the physically handicapped person imparts various artificial expressions to the piano tones through the damper pedal 24.

The controller 31 is connected to the pedal actuator 30 and human interface MS. The human interface MS relays the intention of the physically handicapped musician from his or her head to the controller 31, and the controller 31 analyzes the pieces of information expressing the intention so as to determine the stroke of the damper pedal 24. When the pedal stroke is determined, the controller 31 supplies a driving signal up (t) to the pedal actuator 30. The pedal actuator 30 is energized with the driving signal up (t), and moves the damper pedal 24 to the target position on the trajectory between the rest position and the end position.

When the controller 31 decides the intention to bring the damper pedal 24 into the pedal-on state, the controller 31 causes the pedal actuator 30 to press down to the end position so that all the dampers 20 are perfectly spaced from the strings 19. If the physically handicapped musician wishes to make the acoustic tones softly rather than the prolonged acoustic tones, he or she instructs the controller 31 to bring the damper pedal 24 to the half pedal point. The controller 31 determines the stroke of the damper pedal 24, and adjusts the driving signal up (t) to a certain value of the magnitude. The controller 31 supplies the driving signal up (t) to the pedal actuator 30. The pedal actuator 30 moves the damper pedal 24 to the target position, and keeps it thereat. Thus, the pedaling aid 1 according to the present invention is responsive to the intention of the physically handicapped musician so as to move the damper pedal 24 to any position on the trajectory between the rest position and the end position.

Structure of Pedal Actuator

Figure 3:
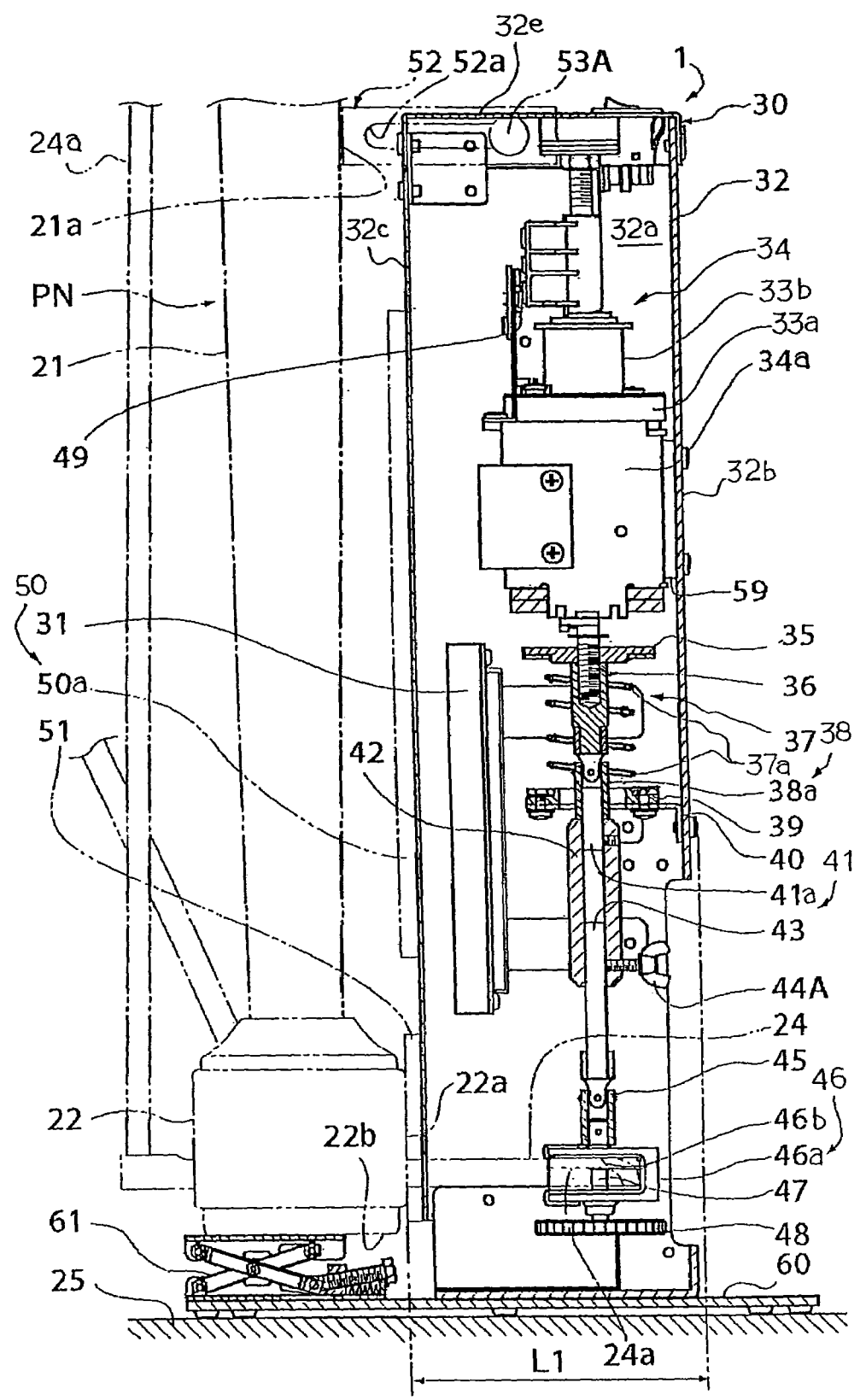
FIG. 3 is a cross sectional side view showing the structure of a pedal actuator incorporated in the pedaling aid.
Figures 4, 5:
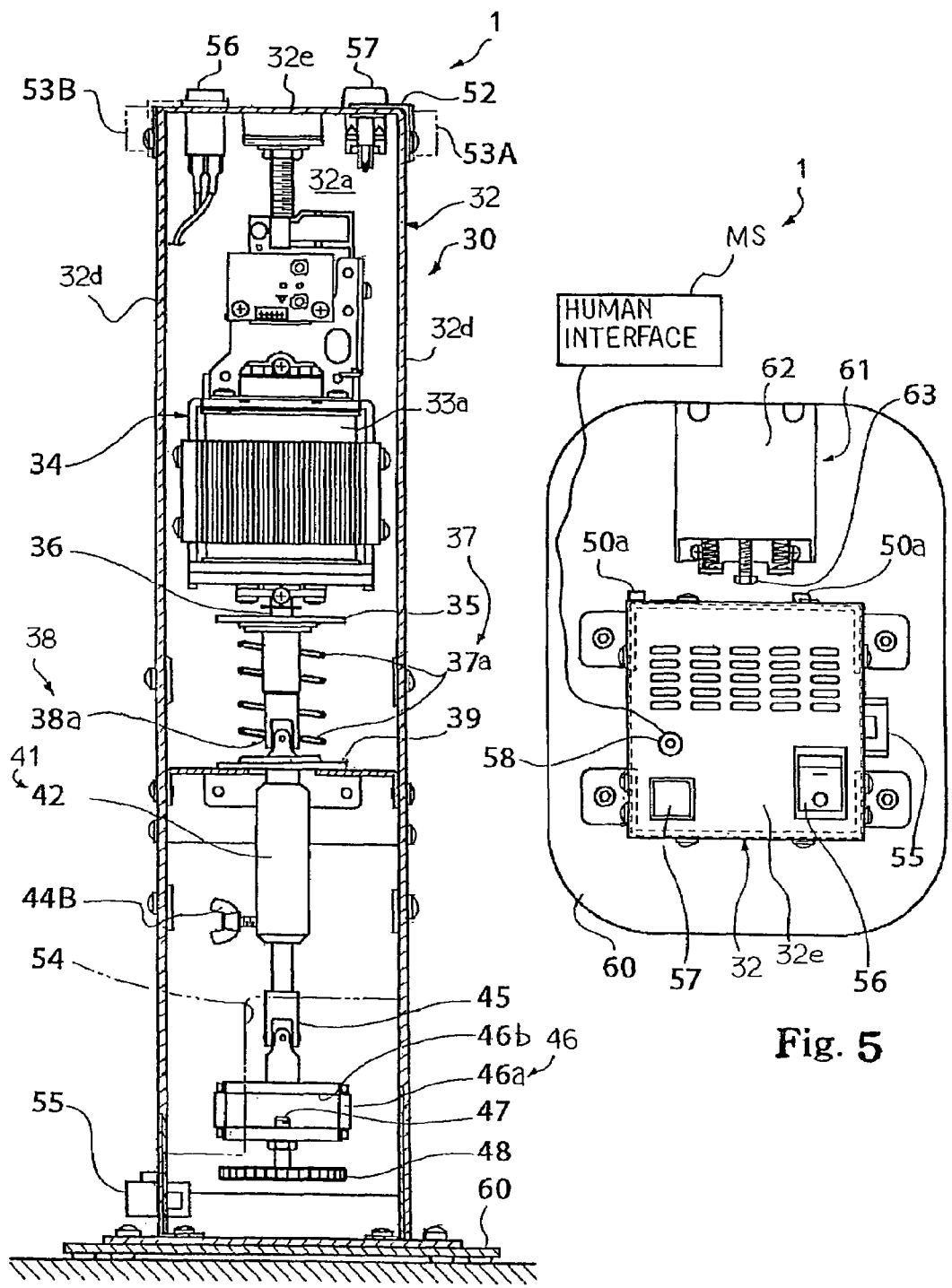
FIG. 4 is a cross sectional back view showing the structure of the pedal actuator.
FIG. 5 is a plane view showing the pedal actuator.

Turning to FIGS. 3, 4 and 5, the pedal actuator 30 includes a case 32, a solenoid-operated actuator 34, a flexible coupling device 38, a locator 50 and a coupling device 61. The case 32 defines an inner space 32a, and the solenoid-operated actuator 34, flexible coupling device 38 and controller 31 are accommodated in the case 32. On the other hand, the locator 50 and coupling device 61 are provided outside of the inner space 32a. The case 32 is located at a proper position with respect to the grand piano PN by the aid of the locator 50, and is coupled to the grand piano PN by means of the coupling device 61. When the case 32 is disposed at the proper position, the damper pedal 24 is inserted into the inner space 32a. Even if the pedal actuator 30 is combined with an upright piano, the locator 50 and coupling device 61 make the pedal actuator 30 disposed at a proper position.

The solenoid-operated actuator 34 and controller 31 are supported by the case 32, and the solenoid-operated actuator 34 is electrically connected to the controller 31. The solenoid-operated actuator 34 is connected to the damper pedal 24 by means of the flexible coupling device 38 so that the flexible coupling device 38 takes up misalignment between the solenoid-operated actuator 34 and the damper pedal 24. In other words, when the controller 31 energizes the solenoid-operated actuator 34, the solenoid-operated actuator 34 exerts the thrust on the damper pedal 24 through the flexible coupling device 38 regardless of the misalignment, and drives the damper pedal 24 to prolong or soften the acoustic piano tones.

The case 32 has a rectangular parallelepiped configuration, and has a front panel 32b, a rear panel 32c, two side panels 32d, a top panel 32e and a bottom plate 60. Casters or another sliding device is provided under the bottom plate 60. The bottom plate 60 is placed on a floor 25 where the grand piano PN also stands. The front panel 32b, rear panel 32c, side panels 32d and top panel 32e are assembled into a quadrangular post, which is upright on the bottom plate 60. Since the lower portions of the side panels 32d are bolted to the upper portions, the lower portions are removable from the case 32, and make the flexible coupling device 38 accessible from the outside. A window 54 is formed in the lower portion of the rear penal 32c (see FIG. 4), and the damper pedal 24 projects into the inner space 32a through the window 54. A power supply connector 55 is provided on the right side panel 32d, and electric power is supplied from an external power source to the power supply connector 55.

On the top plate 32e are provided a power switch, a power indicator and a socket which are respectively designated by reference numerals 56, 57 and 58 as shown in FIG. 5. The electric power is propagated from the power supply connector 55 through the power switch 56 to a suitable transformer (not shown), and control voltage and power voltage are distributed from the transformer (not shown) to the controller 31. While the power switch 56 is being closed, the power indicator 57 emits the light, and notices the users of the power-on state. The socket 58 is electrically connected to the controller 31, and a flexible cable (not shown) extends between the socket 58 and the human interface. The flexible cable (not shown) propagates an input signal sd representative of the intention of the physically handicapped musician from the human interface MS through the socket 58 to the controller 31.

The power switch 56 and socket 58 on the top panel 32e is desirable, because the physically handicapped musician on the wheelchair manipulates the power switch 56 and jack, which is connected to the end of the flexible cable.

The solenoid-operated actuator 34 includes a case 33a, a solenoid (not shown) housed in the case 33a, a plunger 33b, a plunger shaft 36, a return spring unit 37 and a built-in plunger sensor 49, and is supported by the case 32 by means of a bracket 34a. The plunger 33b extends in the up-and-down direction through the solenoid (not shown), and the plunger shaft 36 is connected to the lower end of the plunger 33b. While electric current flows through the solenoid (not shown) as the driving signal up (t), magnetic field is created around the plunger 33b, and magnetic force is exerted on the plunger 33b in the downward direction against the elastic force of the return spring unit 37. When the driving signal up (t) is recovered to the inactive level, the magnetic force is removed from the plunger 33b, and the elastic force urges the plunger 33b in the upward direction. Thus, the driving signal up (t) flowing through the solenoid (not shown) and return spring unit 37 give rise to the plunger motion in the up-and-down direction. While the driving signal up (t) is at the inactive level, the plunger 33b is staying at the upper limit, and the upper limit is called as a "rest position". On the other hand, when the plunger 33b reaches the end of the trajectory, the plunger stops thereat, and the end of the trajectory is called as an "end position".

In this instance, the return spring unit 37 is constituted by a pair of spring retainers 35/39 and a coil spring 37a. The spring retainer 35 is secured to the plunger shaft 36, and the other spring retainer 39 is secured to the case 32 by means of a bracket 40. Thus, the spring retainer 35 is movable together with the plunger shaft 36, and the other spring retainer 39 is stationary. The coil spring 37a is provided between the spring retainers 35 and 39. While the plunger 33b is being downwardly moved, the plunger shaft 36 is downwardly moved together with the spring retainer 35 so that the coil spring 37a is compressed between the spring retainers 35 and 39. This means that the elastic strain energy is accumulated in the coil spring 37a. For this reason, when the electromagnetic force is removed from the plunger 33b, the coil spring 37a urges the spring retainer 35, plunger shaft 36 and plunger 33b in the upward direction.

The plunger sensor 49 monitors the plunger 33b, and produces a plunger position signal yp representative of a current plunger position on the trajectory or plunger stroke from the rest position. The plunger position signal yp is supplied from the plunger sensor 49 to the controller 31. The plunger sensor 49 may be implemented by a photo coupler and a gray scale.

The flexible coupling device 38 aims at the absorption of the misalignment, and is provided between the plunger shaft 36 and the damper pedal 24. The flexible coupling device 38 includes universal joints 38a/45, an expansion joint 41 and a damper 46. The universal joint 38a is connected at the upper end thereof to the plunger shaft 36, and is further connected at the lower end thereof to the expansion joint 41. The damper 46 grasps the damper pedal 24, and the other universal joint 45 is provided between the expansion joint 41 and the damper 46. The expansion joint 41 takes up the difference between the distance from the plunger shaft 36 to the damper pedal 24 and the total length of the flexible coupling device 38, and the universal joints 38a/45 absorbs the misalignment between the plunger shaft 36 and the damper pedal 24. Thus, the flexible coupling device 38 connects the plunger shaft 36 and the damper pedal 24 regardless of the misalignment and difference between the distance and the total length, and transmits the force between the solenoid-operated actuator 34/return spring unit 37 and the damper pedal 24.

Each of the universal joints 38a/45 has two component parts, which are freely tilted to each other, and the expansion joint 41 includes two rods 41a/43, a cylinder 42 and lock bolts 44A/44B. The rods 41a/43 are connected to the universal joints 38a/45, respectively, and are inserted into the cylinder 42. The lock bolts 44A/44B are screwed into the cylinder 42, and press the associated rods 41a/43 to the inner surface of the cylinder 42. The distance is assumed to be greater than the total length. The lock bolts 44A/44B are loosened, and the rods 41a/43 are pushed into the cylinder 42. On the other hand, if the distance is less than the total length, the rods 41a/43 are pulled out from the cylinder 42. When the distance becomes equal to the total length, the lock bolts 44A/44B are screwed into the cylinder 42. As a result, the rods 41a/43 are pressed to the inner surface of the cylinder 42 so that the rods 41a/43 keep the relative position inside the cylinder 42.

The clamper 46 includes a socket 46a, a lock bolt 47 and a knob 48. A hollow space is defined in the socket 46a, and the universal joint 45 is connected to the upper portion of the socket 46a. A threaded hole is formed in the lower portion of the socket 46a, and is open to the hollow space and the lower surface of the socket 46a. The lock bolt 47 is held in threaded engagement with the female screw defining the threaded hole, and the knob 48 is connected to the lower end of the lock bolt 47. When a user wishes to project the lock bolt 47 into or retract it from the hollow space, he or she turns the knob 48. The damper pedal 24 is formed with a dent 24a, and the dent 24a is open to the lower surface of the damper pedal 24.

The damper pedal 24 is received in the hollow space of the socket 46a, and the lock bolt 47 projects into the dent 24a. The lock bolt 47 presses the damper pedal 24 to the inner surface 46b of the socket 46b. Thus, the damper 46 grasps the damper pedal 24.

The locator 50 makes the pedal actuator 30 located at a proper position with respect to the pedal box 22 of the grand piano PN, and includes flat bars 50a/51 and movable spacers 52. Although the flat bars 50a/51 make the pedal actuator 30 located at the proper position with respect to both grand and upright pianos, the movable spacers 52 are only used for the locating work with respect to the grand piano PN.

The flat bars 50a/51 are brought into contact with the grand piano PN. In this instance, the flat bars 51 are brought into contact with the front surface 22a of the pedal box 22. On the other hand, the movable spacers 52 include slidable plates and lock bolts 53A/53B. The slidable plates are slidably supported by the side panels 32d, and are formed with slots 52a. The lock bolts 53A/53B pass through the slots 52a, and are driven into and out of the side panels 32d. When the pedal actuator 30 is located at the proper position, the slidable plates rearwardly project until the rear ends are bought into contact with the lyre post 21, and, thereafter, the lock bolts 53A/53B are tightened. Then, the slidable plates are pressed to the side panels 32d, and keeps the case 32 spaced from the lyre post 21. Even if the physically handicapped person brings the wheelchair into collision with the case 32, the pedal actuator 30 does not fall down.

The flat bars 50a/51 have the rear surfaces spaced from the front panel 32b by distance L1, and are designed in such a manner that the distance L1 is less than a critical length. The critical length is between the end surfaces of the footrests of the wheelchair, which the physically handicapped person keeps at a proper position to finger on the keyboard KB, and the front panel 32b. The critical length is of the order of 12 centimeters, and the distance L1 is adjusted to 11 centimeters in this instance. When the flat bars 51 are held in contact with the front panel 22a, the pedal actuator 30 keeps itself at the proper position, and the physically handicapped musician does not feel the pedal actuator 30 any obstacle.

Since the solenoid-operated actuator 34 and flexible coupling device 38 occupy the space over the damper pedal 24, the distance L1 is reduced. If the solenoid-operated actuator 34 is provided in front of the damper pedal 24, the distance L1 will be greater than the critical length. Thus, the distance L1 is reduced by virtue of the arrangement of the solenoid-operated actuator 34 and flexible coupling device 38.

The coupling device 61 aims at coupling between the grand piano PN and the pedal actuator 30, and is secured to the rear portion of the bottom plate 60. When the pedal actuator 30 is coupled with the grand piano PN by means of the coupling device 61, the pedal actuator 30 does not change the relative position to the grand piano PN. For this reason, the pedal actuator 30 is coupled to the grand piano PN after the locator 50 keeps the pedal actuator 30 at the proper position.

The pedaling aid 1 is prepared for a physically handicapped person as follows. First, the pedal actuator 30 is moved into the space under the keyboard KB. The damper pedal 24 is aligned with the window 54, and the pedal actuator 30 is further moved until the flat bars 50a/51 are brought into contact with the pedal box 22.

When the flat bars 51 are brought into contact with the front penal 22a of the pedal box 22, the coupling device 61 is moved into the space under the pedal box 22, and the damper pedal 24 is inserted into the inner space 32a through the window 54. The coupling device 61 is actuated so as to be pressed to the lower surface of the pedal box 22. The reactive force is exerted on the floor 25 so that the coupling device 61 keeps the pedal actuator 30 stable on the floor 25. The movable spacers 52 are brought into contact with the front surface of the lyre box 21, and prevent the pedal actuator 30 from falling down.

Subsequently, the lower portions of the side panels 32d are removed from the case 32, and the damper 46 is aligned with the damper pedal 24. The expansion joint 41 permits the damper 46 to be on a level with the damper pedal 24, and the flexible joints 38a/45 permit the clamp 46 to be moved in not only the fore-and-aft direction but also the lateral direction. For this reason, the damper pedal 24 is inserted into the socket 46a, and, thereafter, is pressed to the inner surface 46b of the socket 46a by means of the lock bolt 47. The lower portions of the side panels 32d are bolted to the case 32, again.

When the pedaling aid 1 is installed in the space under the keyboard KB, the physically handicapped person moves the wheelchair to the position in front of the keyboard KB. Although the footrests are moved into the space under the keyboard KB, the end surfaces of the footrests are still spaced from the front panel 32b. Thus, the physically handicapped person gets ready to perform a piece of music on the grand piano PN.

Figure 6:
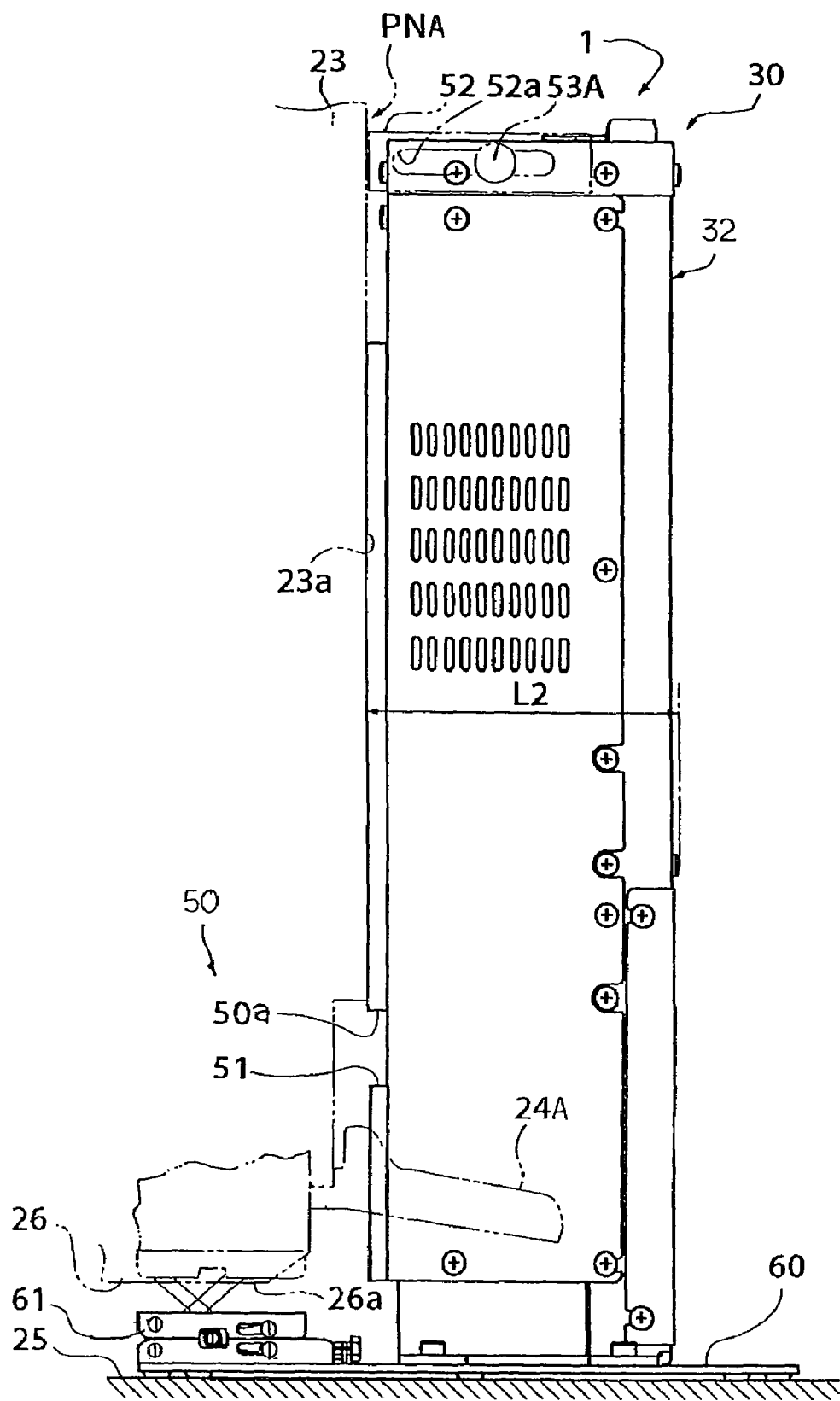
FIG. 6 is a side view showing the external appearance of the pedal actuator combined with an upright piano.

Another physically handicapped person is assumed to wish to perform a piece of music on an upright piano PNA with the assistance of the pedaling aid 1. The pedaling aid 30 is moved into the space under the keyboard of the upright piano PNA as shown in FIG. 6. The damper pedal 24A is aligned with the window 54, and the pedal actuator 30 is pushed until the flat bars 50a are brought into contact with the lower front board 23 of the upright piano PNA. Then, the coupling device 61 is moved into the space under a bottom board 26 of the upright piano PNA, and the damper pedal 24A is inserted into the inner space 32a. The slidable spacers 52 are kept retracted, and the front panel 32b is spaced from the front surface 23a of the lower front board 23 by distance L2, and the distance L2 is less than the critical length. In this instance, the critical length is between the end surfaces of the footrests and the lower front board 23. In this instance, the distance L2 is also 11 centimeters. The reason why the slidable spacers 52 are not used is that the flat bars 50a, which are higher than the flat bars 51, prevent the pedal actuator 30 from falling down. Of course, it is possible to use the slidable spacers 52.

The coupling device is actuated so as to exert the force on the lower surface 26a of the bottom board 26. The reactive force presses the bottom plate 60 against the floor 25, and the pedal actuator 32 can not change the relative position to the upright piano PNA. Thus, the coupling device 61 keeps the pedal actuator 30 stable on the floor 25.

The damper pedal 24A is connected to the damper 46 by the aid of the flexible coupling device 38, and the physically handicapped person gets ready to perform a piece of music on the upright piano PNA.

Figure 7:
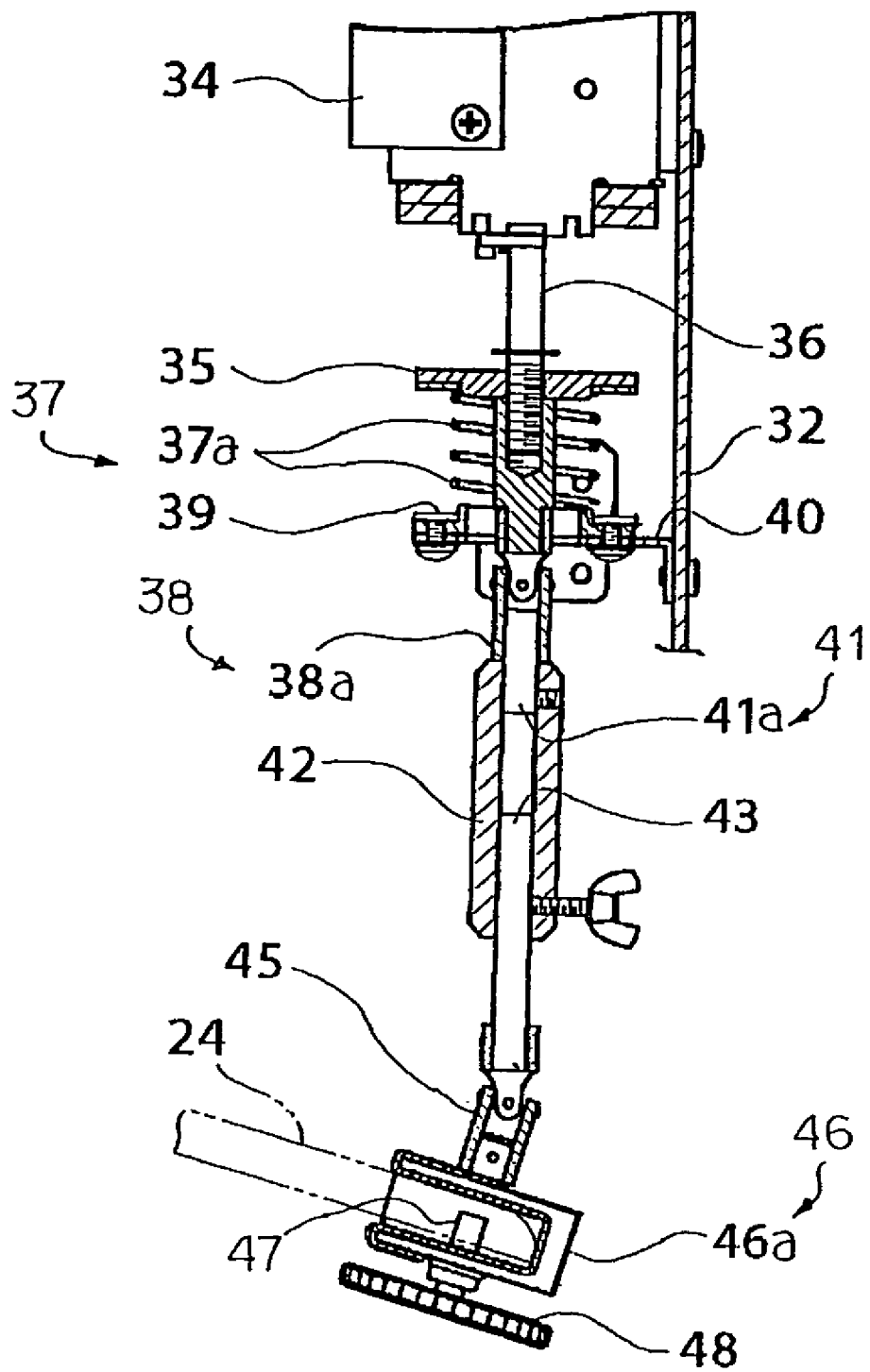
FIG. 7 is a cross sectional side view showing the pedal pressed down by means of the pedal actuator.

When the physically handicapped person wishes to prolong the tones in the performance on the acoustic piano PN or PNA, he or she instructs the controller 31 to press down the damper pedal 24 through the human interface MS. The controller 31 determines the target pedal stroke, and drives the solenoid-operated actuator 34 with the driving signal up (t) to press down the damper pedal 24 over the target pedal stroke. While the solenoid-operated actuator presses down the damper pedal 24 against the elastic force of the return spring 37a, the plunger 33b projects downwardly, and the damper pedal 24 is inclined from the rest position. As a result, the damper 46 is deviated from the centerline of the plunger 33b. The universal joints 38a/45 are bent as shown in FIG. 7, and takes up the deviation. For this reason, the plunger 33b is smoothly moved out of the solenoid 33a.

When the physically handicapped person instructs the controller 31 to recover the damper pedal 24 from the depressed state to the rest position, the controller 31 decreases the magnitude of the driving signal up (t), and the return spring 37a pushes the plunger 33b upwardly. The universal joints 38a/45 make the plunger 33b smoothly retracted into the solenoid 33a.

System Configuration of Controller

Turning back to FIG. 2 of the drawings, the controller 31 includes a bus system 10, a central processing unit 11, which is abbreviated as "CPU", a timer 12, a MIDI interface 13, which is abbreviated as "MIDI I/F", a memory unit 14, a random access memory 16, which is abbreviated as "RAM", a read only memory 17, which is abbreviated as "ROM", and a pedal drive unit 18. The system components 11, 12, 13, 14, 16, 17 and 18 are connected to the bus system 10 so that the central processing unit 11 is communicable with the other system components 12, 13, 14, 16, 17 and 18 through the bus system 10. The timer 12 may be implemented by software.

The central processing unit 11 offers the data processing capability to the controller 31. A computer program, which includes a main routine program and plural subroutine programs, is stored in the read only memory 17, and runs on the central processing unit 11 so as to achieve given tasks. Thus, the read only memory 17 serves as a program memory. Parameter tables and other sorts of control data are further stored in the read only memory, and the central processing unit 11 accesses the parameter tables and other sorts of control data during the execution of the instructions expressed by the computer program. The read only memory 17 may be implemented by electrically erasable and programmable read only memory devices. The electrically erasable and programmable read only memory devices permit a user to rewrite the computer program for version-up.

The random access memory 16 serves as a temporary data storage. Plural set of music data codes, which express pieces of music, are stored in a certain memory location in the random access memory 16, and another memory location is assigned to flags. While a physically handicapped person is performing a pieces of music, a piece of target pedal position data is memorized in yet another memory location, and pieces of current plunger position data are accumulated in still another memory location as will be hereinlater described in detail.

A MIDI device such as an electronic keyboard or a personal computer system is connected to the MIDI interface 13 through a MIDI cable, and MIDI music data codes are transferred through the MIDI interface 13.

The timer 12 gives timing for a timer interruption. When the timer interruption takes place, a certain subroutine program branches to another subroutine program. The memory unit 14 has a data holding capability larger than the random access memory 16. The memory unit 14 may be implemented by a hard disk driver or flash memory devices.

The pedal drive unit 18 includes a pulse width modulator, and is responsive to a control signal, which is supplied from the central processing unit 11 through the bus system 10, so as to adjust the driving signal to a target duty ratio. The central processing unit 11 determines the target duty ratio on the basis of the input signal sd representative of the target pedal stroke. The pedal driver unit 18 supplies the driving signal to the solenoid-operated actuator 34 so that the solenoid-operated actuator 34 presses down the damper pedal 24 through the flexible coupling device 38.

The plunger sensor 49 monitors the plunger 33b, and supplies the pedal position signal yp representative of the current pedal stroke to the central processing unit 11. The central processing unit 11 compares the target peal stroke with the current pedal stroke, and regulates the control signal if the central processing unit 11 finds a difference through the comparison. Thus, the central processing unit 11, pedal driver unit 18, pedal actuator 30 and plunger sensor 49 form in combination a servo control loop. Although the input signal sd and plunger position signal yp are input to a suitable signal interface, the signal interface is deleted from the system configuration shown in FIG. 2.

Human Interface

Figure 8:
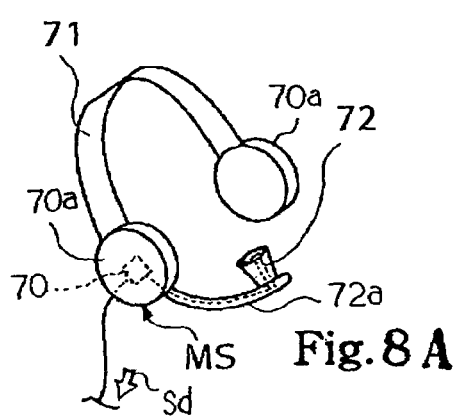
FIG. 8A is a schematic perspective view showing a human interface incorporated in the pedaling aid.
FIG. 8B is a circuit diagram showing a brow sensor incorporated in the human interface.
FIG. 8C is a graph showing the relation between the potential level of an input signal produced in the human interface and a target pedal stroke.
Figure 8:
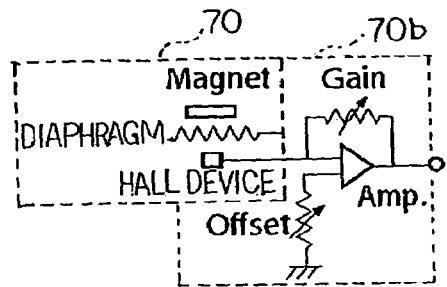
Figure 8C:
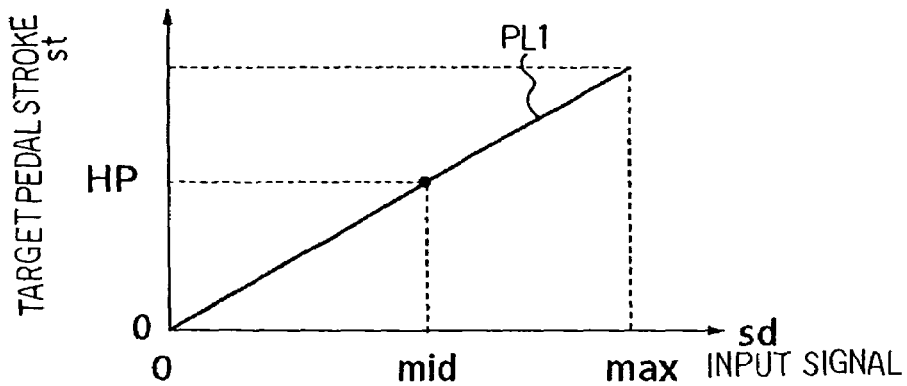

Turning to FIGS. 8A, 8B and 8C, the human interface MS includes a blow sensor 70, a pair of ear cushions 70a, a headband 71, a mouthpiece 72 and an arm 72a. The headband 70 is curved along the contour of the head of a human being, and the ear cushions 70a are connected at both ends of the headband 71. The blow sensor 70 is embedded in one of the ear cushion 70a, and the arm 72a projects from the ear cushion 70a. The mouthpiece 72 is connected to the end of the arm 72a, and is spaced from the ear cushion 70a by a predetermined distance roughly equal to the distance between the ear and the mouth. For this reason, when a physically handicapped person puts the human interface MS on the head, the arm 72a keeps the mouthpiece 72 in the vicinity of the mouth of the physically handicapped person. An air passage is formed in the arm 72a so that the mouthpiece 72 is connected through the air passage to the blow sensor 70.

The brow sensor 70 has a diaphragm, a piece of magnet and a Hall device. When the physically handicapped person blows into the mouthpiece 72, the pressure is exerted on the diaphragm, and gives rise to the deformation of the diaphragm. The piece of magnet and Hall device convert the deformation to variation of resistance against electric current, which is supplied to an amplifier 70b. In this instance, the amplifier 70b is implemented by an operational amplifier and variable resistors, and the input signal sd is supplied from the amplifier 70b to the controller 31.

As described hereinbefore, the input signal is representative of the target pedal stroke. The potential level of the input signal sd is indicative of the target pedal stroke, and is periodically sampled and converted to a binary number in the signal interface (not shown). The relation between the potential level and the target pedal stroke is expressed by plots PL1 (see FIG. 8C), and is stored in the read only memory 17 in the form of table. The central processing unit 11 periodically accesses the table with the binary value, and reads out the target pedal stroke from the table. In this instance, the rest position is corresponding to "0", and the end position is indicated by "max".

When the physically handicapped musician wishes to make the piano tones soft, he or she weakly blows into the mouthpiece 72 so that the input signal sd is regulated to "mid". The central processing unit 11 decides the target pedal stroke to be "HP", at which the damper pedal 24 surely enters the half pedal state, and instructs the pedal drive unit 18 to adjust the driving signal up (t) to a corresponding value of duty ratio. The target pedal stroke HP is referred to as a "half pedal point", and the half pedal point is a discriminative point for the central processing unit 11 in the half pedal state.

The human interface MS may be designed to output the input signal sd at the potential level "max" when the pressure exceeds a predetermined value at which the damper pedal 24 surely exits from the half pedal state.

When the physically handicapped musician wishes to recover the tones to the normal tone length, he or she stops to exert the pressure on the diaphragm. Then, the input signal is decayed to the minimum potential level. The central processing unit 11 accesses the table with the binary number of "0", and reads out the target pedal stroke of zero from the table. The central processing unit 11 instructs the pedal drive unit 18 to minimize the duty ratio. The pedal drive unit 18 adjusts the driving signal up (t) to the minimum value so that the solenoid-operated actuator 34 retracts the plunger 33b into the solenoid 33a with the assistance of the return spring 37a. As a result, the damper pedal 24 returns to the rest position, and the dampers 20 are selectively spaced from and brought into the associated strings 19 depending upon the key motion.

Figure 9:
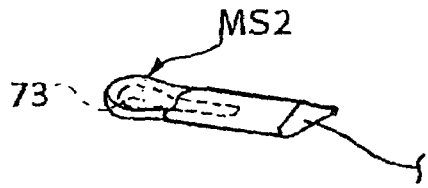
FIG. 9A is a schematic perspective view showing another human interface.
FIG. 9B is a circuit diagram showing the equivalent circuit of the human interface shown in FIG. 9A.
FIG. 9C is a cross sectional view showing the structure of the human interface.
FIG. 9D is a schematic perspective view showing yet another human interface.
FIG. 9E is a schematic perspective view showing still another human interface.
FIG. 9F is a schematic side view showing yet another human interface.
FIG. 9G is a side view showing still another human interface.
FIG. 9H is a schematic perspective view showing an air bladder forming the part of the human interface shown in FIG. 9G.
FIG. 9I is a schematic perspective view showing yet another human interface.
FIG. 9J is a side view showing still another human interface.
FIG. 9K is a side view showing yet another human interface.
Figure 9:
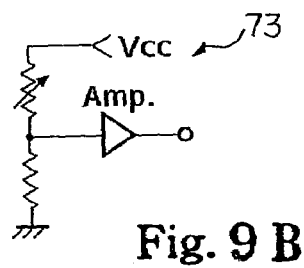
Figure 9:
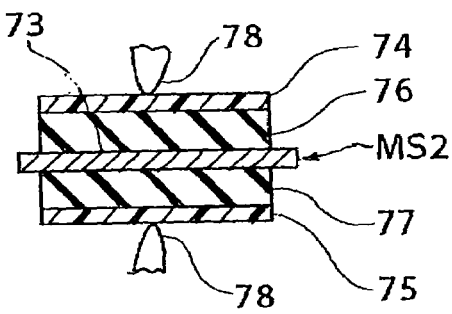
Figure 9:
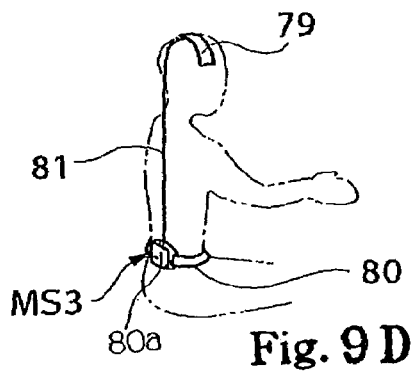
Figure 9:
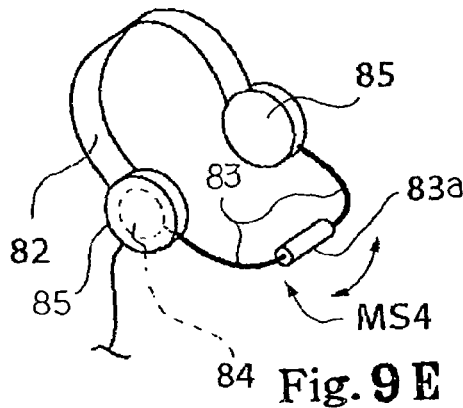
Figure 9:
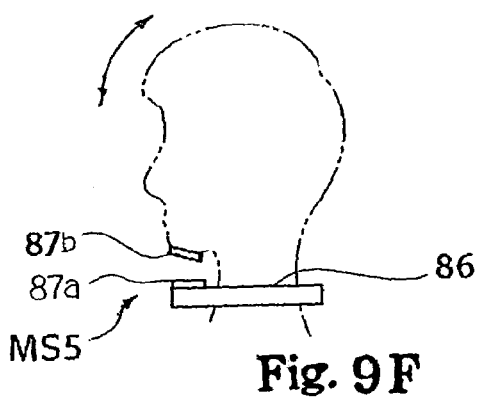

FIGS. 9A, 9B and 9C show another human interface MS2. A pressure sensor 73 is incorporated in the human interface MS2. The pressure sensor 73 is equivalent to a combination of an amplifier and a series of a variable resistor and a resistor connected between a power voltage Vcc and the ground. The amplifier is connected to the node between the variable resistor and the resistor. A physically handicapped musician puts the human interface MS2 in the mouth, and keeps the human interface MS2 between the teeth 78. The pressure sensor 73 is sandwiched between resilient layers 76 and 77, and the outer surfaces of the resilient layers 76 and 77 are covered with rigid plates 74 and 75.

When the physically handicapped musician wishes to change the pedal position, he or she bites the rigid plates 74 and 75. The force is exerted on the rigid plates 74 and 75, and is transmitted from the rigid plates 74 and 75 through the resilient layers 76 and 77 to the pressure sensor 73. The resilient layers 76 and 77 prevent the pressure sensor 73 from the concentration of the force at narrow areas on the pressure sensor 73. Thus, the physically handicapped person changes the pedal position by biting the human interface.

FIG. 9D shows yet another human interface MS3. The human interface MS3 includes a belt 80, a volume controller 80a, a piece of wire 81 and a headband 79. The term "volume controller" stands for a variable resistor. The volume controller 80a is attached to the belt 80, and the piece of wire 81 is connected between the volume dial (not shown) and the headband 79. The physically handicapped person wears the belt 80, and puts the headband 79 on the head. The piece of wire 81 extends from the head through the back to the volume dial. When the physically handicapped person wishes to push down the damper pedal 24, he or she inclines the head. Then, the piece of wire 81 is pulled, and rotates the volume dial so as to vary the potential level of the input signal sd. Thus, the human interface MS3 is available for the pedaling aid of the present invention.

FIG. 9E shows still another human interface MS4. The human interface MS4 includes a headband 82, a pair of arms 83, a chin pad 83a, a volume controller 84 and a pair of ear cushions 85. The headband 82 is curved along the contour of the head of a physically handicapped person, and the ear cushions 85 are connected to both ends of the headband 82. The volume controller 84 is embedded in one of the ear cushions 85. Though not shown in FIG. 9E, a suitable bearing such as a roller bearing is embedded in the other ear cushion 85, and the outer race of the roller bearing is fixed to the ear cushion. The arms 83 are fixed at inner ends thereof to the volume dial (not shown) and the inner race of the roller bearing, and the chin pad 83a is connected to the other ends of the arms 83. A return spring (not shown) urges the arms 83 to the chin of the physically handicapped musician.

When the physically handicapped musician puts the headband on his or her head, the chin pad 83a is located in the vicinity of the chin. The physically handicapped musician is assumed to be fingering on the keyboard KB. When the physically handicapped musician wishes to press down the damper pedal 24, he or she pushes the chin pad 83a with his or her chin. Then, the volume dial is rotated, and the volume controller 84 changes the potential level of the input signal sd. Thus, the human interface MS4 is available for the pedaling aid of the present invention.

The human interfaces MS3 and MS4 may further include a resistance regulator. The resistance regulator permits the user to regulate the resistance against the rotation of the volume dial to a suitable value. The user makes the resistance equal to the resistance against the pedal motion so that the physically handicapped musician feels the chin pad 83a heavier after the half pedal point than that before it.

The human interfaces MS3 and MS4 may further include a vibrator, which gives rise to vibrations of the chin pad 83a at the timing to reach the half pedal point. Otherwise, the human interface MS4 may periodically give large resistance to the chin pad 83a. In this instance, the physically handicapped musician easily recognizes the current pedal position.

FIG. 9F shows yet another human interface MS5. The human interface MS5 includes a collar 86, a Hall device 87a and a piece of magnet 87b. The Hall device 87a is fixed to the collar 86, and a physically handicapped musician puts the collar 86 on his or her neck as shown. The physically handicapped musician keeps the piece of magnet 87b on his or her chin by means of a suitable device such as, for example, a headband, a pair of nose pads, sidepieces or an adhesive sheet in such a manner that the piece of magnet 87b is opposed to the Hall device 87a. The Hall device 87a varies the resistance against the electric current depending upon the distance between the Hall device 87a and the piece of magnet 87b so that the potential level of the input signal sd is also varied depending upon the distance between the Hall device 87a and the piece of magnet 87b. Thus, the human interface MS5 is available for the pedaling aid of the present invention.

FIGS. 9G and 9H show still another human interface MS6. The human interface MS6 includes a collar 88, an air bladder 89a and a pressure sensor 89b. The air bladder 89a is clamped at both ends thereof with the collar 88, and a physically handicapped musician puts the collar 88 on his or her neck, and keeps the pressure sensor 89b on his or her chin in such a manner that the pressure sensor 89b is opposed to the air bladder 89a.

When the physically handicapped musician wishes to press down the damper pedal 24, he or she inclines his or her head as indicated by the arrow in FIG. 9G, and presses the pressure sensor 89b to the air bladder 89a. The pressure sensor 89b is sensitive to the reactive force, and raises the potential level of the input signal sd. Thus, the human interface MS6 is available for the pedaling aid of the present invention.

FIG. 9I shows yet another human interface MS7. The human interface MS7 includes a pair of pressure sensors 90 and 91 and a mouth plate 91a. The mouth plate 91a is as wide as the mouth of a physically handicapped musician, and the pressure sensors 90 and 91 project from both sides of the mouth plate 91a. The pressure sensors 90 and 91 are spaced from each other by a gap, in which the physically handicapped musician can insert his or her tongue.

While the physically handicapped musician is performing a piece of music on the acoustic piano PN or PNA, he or she keeps the mouth plate 91a inside his or her mouth with his or her teeth. When the physically handicapped musician wishes to press down the damper pedal 24, he or she sidewardly pushes one of the pressure sensors 90 or 91 with his or her tongue. Then, the potential level of the input signal sd rises. On the other hand, when the physically handicapped musician wishes to return the damper pedal 24, he or she pushes the other pressure sensor 91 or 90 with the tongue. Then, the potential level of the input signal sd is decayed. Thus, the human interface is available for the pedaling aid of the present invention.

FIG. 9J shows still another human interface MS8. The human interface MS8 includes a contact 92 secured to a headband 92a, a weight piece 93 and a leaf contact 94 also supported by the headband 92a. The weight piece 93 is fixed to the lower end of the leaf contact 94, and the leaf contact 94 is hung from the headband 92a. The contact 92 is supplied with a positive voltage, and the leaf contact 94 is grounded.

While a physically handicapped musician keeps his or her head straight, the contact 92 is spaced from the leaf contact 94, and any current flows from the contact 92 to the leaf contact 94 so that the input signal is in a high voltage. When the physically handicapped musician wishes to move the damper pedal 24 to the end position, he or she inclines his or her head. Then, the piece of weight 93 is swung, and the leaf contact 94 is brought into contact with the contact 92. The electric current flows through the contacts 92 and 94, and the input signal is decayed to a low voltage. Thus, the input signal is changed between the high voltage level and the low voltage level. The controller 31 measures the time period in which the input signal stays at the high voltage level and low voltage level, and determines the pedal stroke proportionally to the time period.

FIG. 9K shows yet another human interface MS9 available for the two-stable pedal action. The human interface MS9 includes a cylinder body 95 attached to a headband (not shown), mercury 96 sealed inside the cylinder body 95 and a pair of contacts 97 and 98. The contacts 97 and 98 are located at a certain side of the cylinder body 95.

When a physically handicapped person inclines the cylindrical body 95 as indicated by arrows, the mercury 96 is moved between the other side and the certain side. When the mercury reaches the certain side, the contacts 97 and 98 are closed, and the input signal sd is supplied to the controller 31. The controller measures the time period in which the contacts 97 and 98 are closed, and determines the pedal stroke depending upon the time period. The controller 31 calculates the velocity of the mercury, and determines the pedal velocity proportional to the velocity of the mercury.

As will be understood from the foregoing description, the physically handicapped musician puts the human interface MS on his or her head, and manipulates the human interface MS through the organ on the head such as the mouth, tongue or chin without changing the attitude of the trunk of the body. For this reason, the physically handicapped person is less liable to fall down the chair.

Moreover, the controller 31 maps the physical quantity expressed by the input signal to the pedal stroke. In other words, it is possible for the controller 31 continuously to move the pedal 24 on the trajectory between the rest position and the end position. As a result, the physically handicapped musician can brings the pedal into the half pedal state as well as the pedal-on state and pedal-off state with the assistance of the pedaling aid. Thus, the pedaling aid according to the present invention permits the physically handicapped musician to give the artificial expressions to his performance.

The pedaling aid is easily coupled to or separated from the musical instrument by means of the coupling device 61. Thus, the physically handicapped musician easily obtains the assistance of the pedaling aid by virtue of the coupling device.

The locator 50 permits the user quickly and easily to locate the pedaling aid at the proper position. Thus, the pedaling aid according to the present invention is friendly to the physically handicapped persons. Although the flat bars 50a and 51 are selectively used in the locating work, the unused flat bars are not any obstacle to the other sort of acoustic piano.

The solenoid-operated actuator 34 and flexible coupling device 38 are located over the damper pedal 24 so that the manufacturer reduces the thickness of the case 32. The thin case is desirable for the physically handicapped musician on the wheelchair, because the physically handicapped musician on the wheelchair does not feel the pedal actuator 30 obstacle.

Modifications

Although the particular embodiment of the present invention has been shown and described, it will be apparent to those skilled in the art that various changes and modifications may be made without departing from the spirit and scope of the present invention.

For example, the controller 31 may be installed outside of the pedal actuator 30. The controller 31 may be attached to the piano cabinet. In this instance, the controller 31 is connected to the pedal actuator 30 through cables.

A pedaling aid of the present invention may include more than one pedal actuator, which a physically handicapped person selectively energizes for moving the associated pedals to any positions on their trajectories. In this instance, a tilt sensor or tilt sensors may monitor the head of the physically handicapped musician. When the physically handicapped musician wishes to actuate one of the pedals, he or she tilts the head toward the predetermined direction, and the associated tilt sensor transfers the intension of the physically handicapped musician to the controller. Otherwise, more than one sort of the human interfaces MS1 to MS7 may be put on the physically handicapped musician.

The acoustic pianos do not set any limit to the technical scope of the present invention. A pedaling aid of the present invention may be provided for an electronic piano.

The damper pedal 24 also does not set any limit to the technical scope of the present invention. The pedaling aid may be provided for a soft pedal and/or a sostenuto pedal.

The relation between the potential level of the input signal sd and the target pedal stroke st may be expressed by a curve. In this instance, the half pedal state is assigned a gently curved portion so that the controller 31 easily brings the damper pedal 24 into the half pedal state.

The solenoid-operated actuator 34 does not set any limit to the technical scope of the present invention. A hydraulic actuator may be incorporated in a pedaling aid according to the present invention. The solenoid-operated pedal actuator 34 may be replaced with a stepping motor and a suitable motion converter such as, for example, a pinion and rack.

Figure 10A:
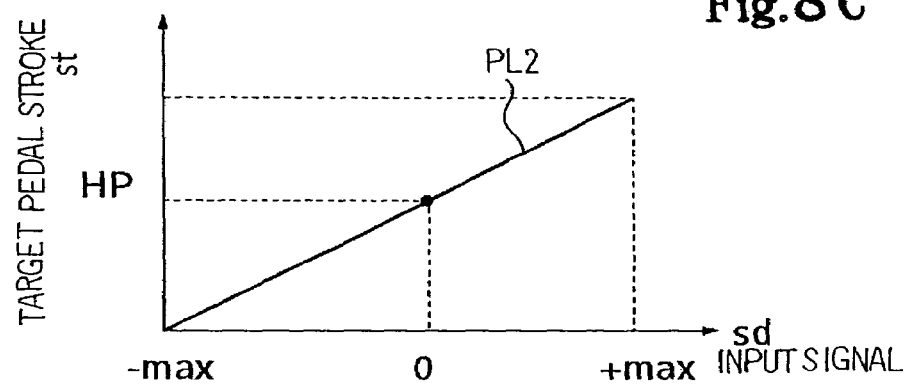
FIG. 10A is a graph showing a relation between the target pedal stroke and the potential level of an input signal of a human interface responsive to both inhalation and exhalation.
Figure 10B:
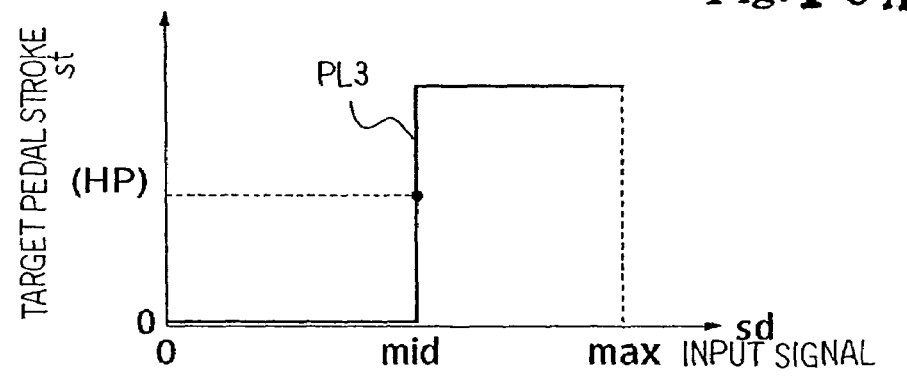
FIG. 10B is a graph showing converting characteristics for bi-stable pedal motion.
Figure 10C:
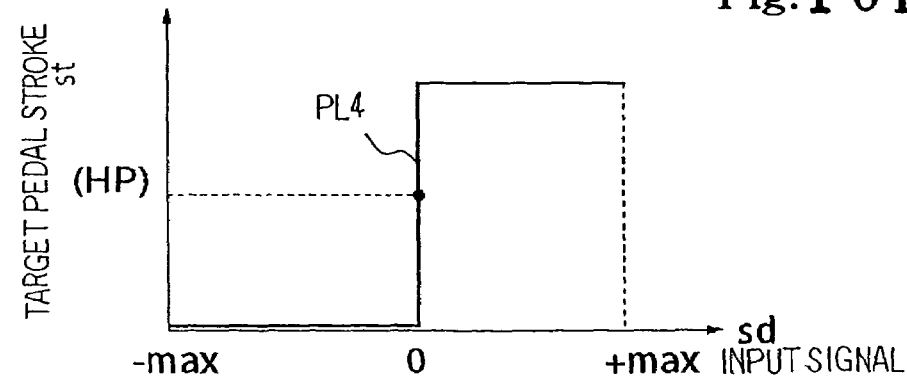
FIG. 10C is a graph showing other converting characteristics for bi-stable pedal motion.
Figure 9:
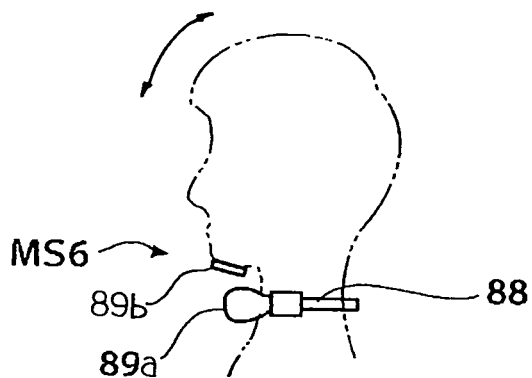
Figure 9:
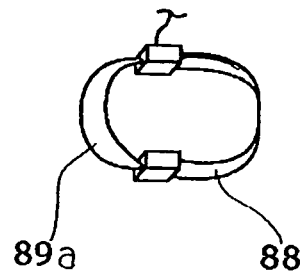
Figure 9:
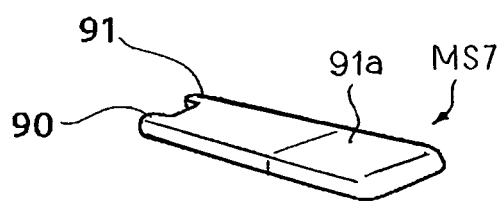
Figure 9:
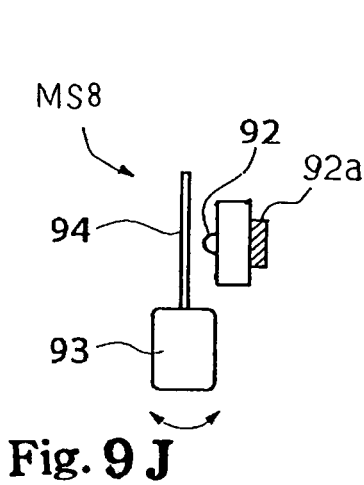
Figure 9:
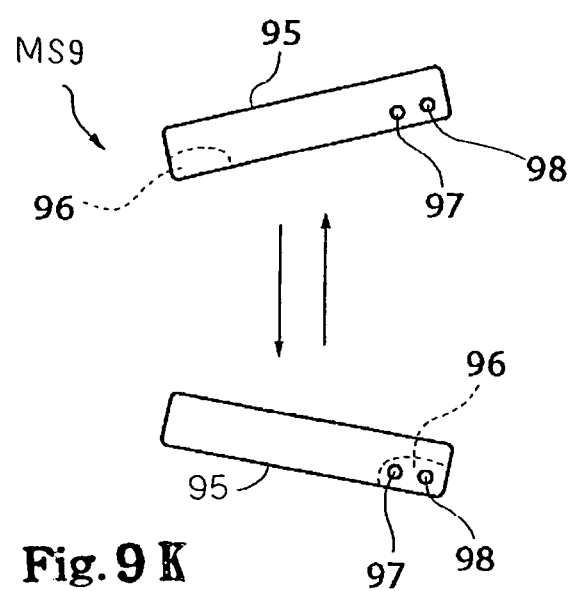

The pedaling aid according to the present invention may realize the bi-stable pedal motion, i.e., the pedal-on and pedal-off. Plots PL3 shown in FIG. 10B are representative of a relation between the pedal stroke st and the potential level of the input signal sd. While the potential level is being fallen within the range from zero to mid, the central processing unit 11 instructs the pedal drive unit 18 to keep the damper pedal 24 at the minimum pedal stroke st. When the potential level exceeds the potential level mid, the central processing unit 11 instructs the pedal drive unit 18 to move the damper pedal 24 to the maximum pedal stroke. In case where the blow sensor 70 is responsive to both inhalation and exhalation, the relation is expressed by plots PL4 in FIG. 10C. The terms "minimum pedal stroke" and "maximum pedal stroke" do not always mean the rest position and end position. The minimum pedal stroke may indicate a pedal position slightly spaced from the rest position, and the maximum pedal stroke may indicate a pedal position close to but spaced from the end position.

A relation expressed by a hysteresis loop may be more desirable for the bi-stable pedal motion.

The diaphragm may be responsive to both inhalation and exhalation. In this instance, the input signal sd varies the potential level in both negative and positive regions as indicated by plots PL2 in FIG. 10A. The potential level of zero is assigned to the half point HP, and the potential level (−max) and potential level (+max) are assigned to the minimum pedal stroke and the maximum pedal stroke, respectively. In this instance, while the physically handicapped musician exerts neither positive pressure nor negative pressure on the diaphragm, the human interface keeps the input signal sd at zero, and the central processing unit 11 instructs the pedal drive unit 18 to stay at the half point HP. On the other hand, when the physically handicapped musician wishes to prolong the acoustic tones, he or she blows into the mouthpiece 72, and exerts the positive pressure on the diaphragm. Then, the human interface raises the potential level of the input signal sd toward the positive maximum value+max, and the central processing unit 11 instructs the pedal drive unit 18 to press down the damper pedal 24. On the other hand, when the physically handicapped musician wishes to produce the acoustic tones for the normal time period, he or she sucks the air through the mouthpiece 72, and exerts the negative pressure on the diaphragm. Then, the human interface decays the potential level in the negative region, and the central processing unit 11 instructs the pedal drive unit 18 to return the damper pedal toward the rest position. As will be understood, when the physically handicapped musician wishes to bring the damper pedal 24 to the half pedal point, he or she removes the pressure from the diaphragm. Thus, the physically handicapped musician easily puts the damper pedal 24 in the half pedal state.

The diaphragm, piece of magnetic and Hall device do not set any limit to the technical scope of the present invention. An air flow meter may be installed in the air passage. In this instance, a relation between the air velocity and the pedal stroke is stored in the controller 31, and the central processing unit 11 instructs the pedal drive unit 18 to move the damper pedal 24 proportionally to the air velocity. Otherwise, the central processing unit may integrate the air velocity so as to determine the amount of air, and controls the damper pedal 24 depending upon the amount of air. The operational amplifier may integrate or differentiate the potential level at the input node.

The controller 31 may count the switching actions between the on-state and the off-state per unit time, and determines the pedal stroke proportionally to the number of switching actions.

An array of switches may be used as another human interface. In this instance, the physically handicapped musician selectively turns on the switches.

The human interface may be attached to a part of the body except for the trunk. The human interface may be attached to a shoulder or elbow.

The headband does not set any limit to the technical scope of the present invention. The human interface MS may be supported by a suitable holder, which stands on the floor 25 or a component board of the musical instrument so as to keep the mouthpiece or chin pad 83a close to the mouth or chin of the physically handicapped musician.

The coupler 46 and flexible coupling device 38 are not indispensable component parts of the pedal actuator 30. Even if the coupler 46 and coupling device 38 are deleted from the pedal actuator 30, it is possible to directly push the damper pedal 24 with the plunger 33b of the solenoid-operated actuator 34.

The controller 31 may be further responsive to the MIDI music data codes expressing the effects to be imparted to the acoustic tones. In this instance, a tutor may supply the MIDI music data codes through the MIDI interface 13 to the controller 31, and the controller 31 slightly moves the pedal or pedals so as to guide the physically handicapped person in the exercise.

Second Embodiment

Figure 11:
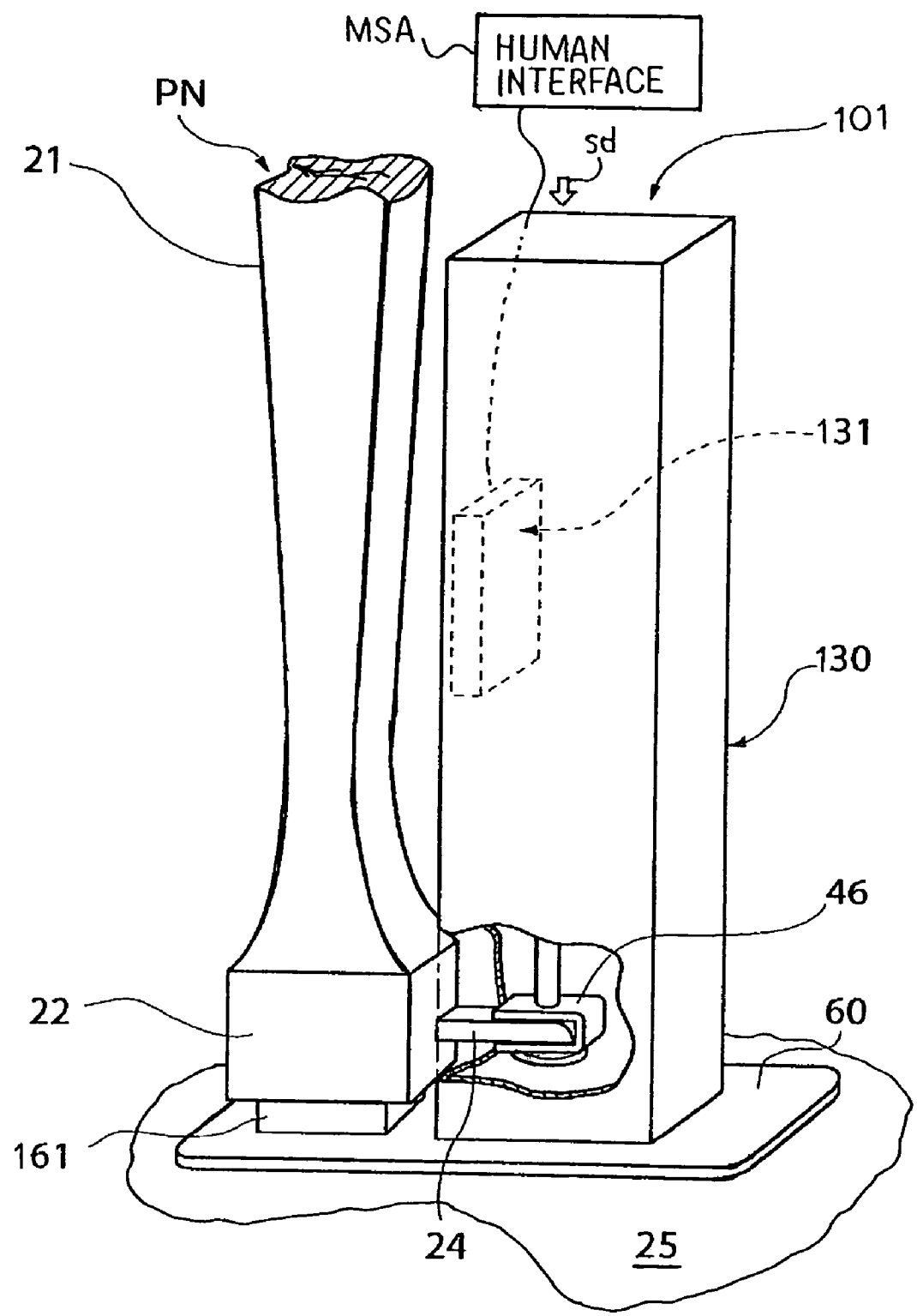
FIG. 11 is a partially cut-away perspective view showing a pedaling aid assembled with a pedal of an acoustic piano.
Figure 12:
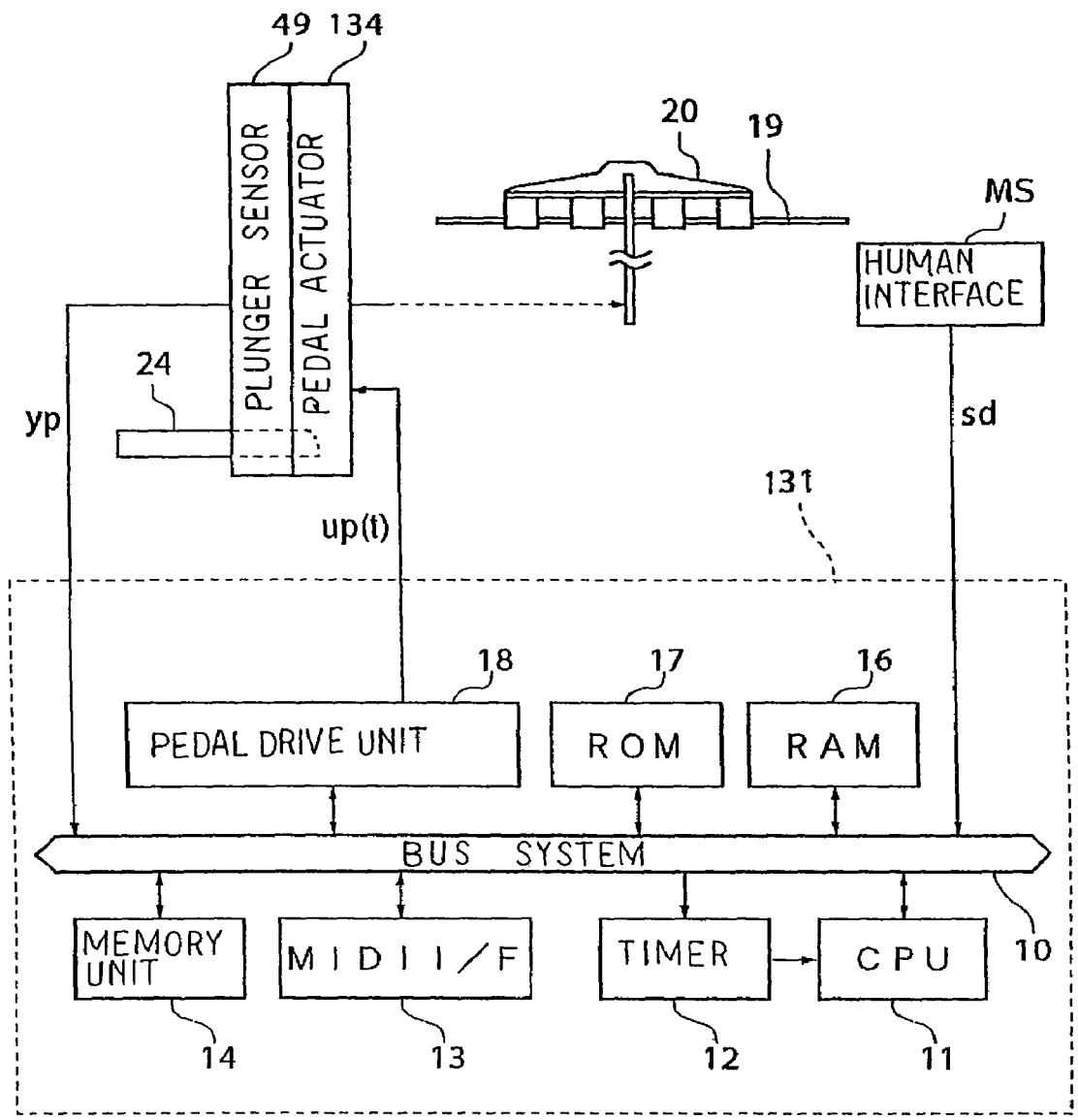
FIG. 12 is a block diagram showing the system configuration of a controller incorporated in the pedaling aid.

Turning to FIG. 11 of the drawings, another pedaling aid 101 embodying the present invention largely comprises a pedal actuator 130, a controller 131 and a human interface MSA. The human interface MSA produces an input signal sd, and supplies the input signal to the controller 131. The controller 131 analyzes pieces of intention data and determines a target pedal position on a pedal of an acoustic piano PN through the analysis. When the target pedal position is determined, the controller 130 adjusts a driving signal up (t) to a target duty ratio, and supplies the driving signal up (t) to the pedal actuator 130 so that the pedal actuator 130 move the pedal 24 on the predetermined pedal trajectory. The acoustic piano PN is same as that described in conjunction with the first embodiment. For this reason, the component parts of the acoustic piano PN is labeled with references designating the corresponding component parts without detailed description.

The system configuration of the controller 131 is shown in FIG. 2, and is similar to that of the controller 31. In order to avoid undesirable repetition, description on the controller 131 is omitted, and system components of the controller 131 are labeled with references designating the corresponding system components of the controller 31.

Figure 13:
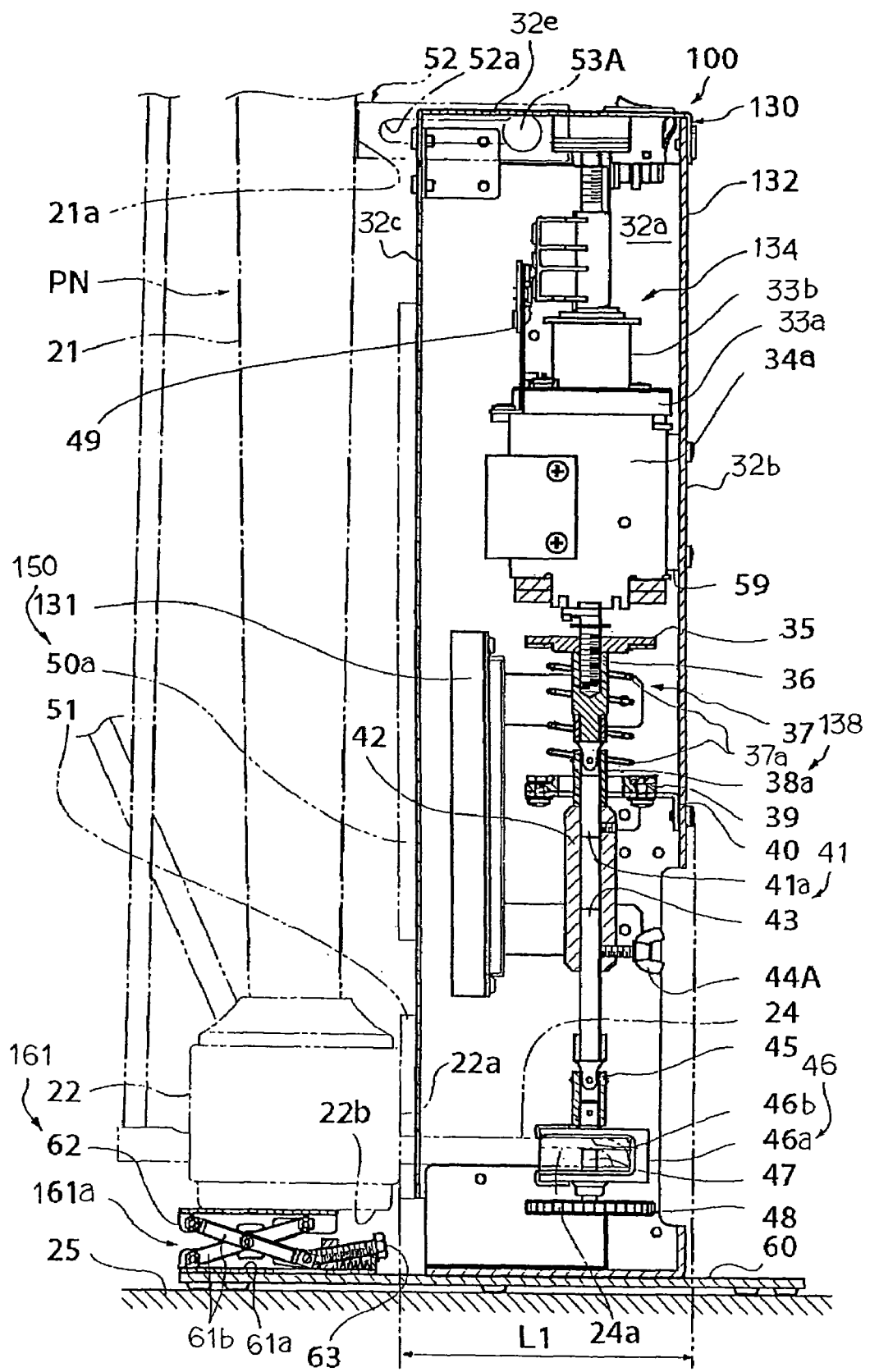
FIG. 13 is a cross sectional side view showing the structure of a pedal actuator incorporated in the pedaling aid.

Turning to FIGS. 13, 14 and 15, the pedal actuator 130 includes a case 132, a solenoid-operated actuator unit 134, a flexible coupling device 138, a locator 150 and a coupling device 161. The case 132, solenoid-operated actuator unit 134, flexible coupling device 138 and locator 150 are similar in structure to those of the first embodiment. For this reason, no further description on the similar components 132, 134, 138 and 150 is hereinafter incorporated, and component parts are labeled with references designating the corresponding component parts for the sake of simplicity.

Description is hereinafter made on the coupling device 161. The coupling device 161 is mounted on the bottom plate 60 of the case 132, and includes a jack 161a and a driver 63. The jack 161a has a base plate 61a, a pusher 62 and bars 61b. The base plate 61a is fixed to the bottom plate 60. The bars 61b pivotally cross one another, and are connected at the lower ends thereof to the base plate 61a and at the upper ends thereof to the pusher 62. In this instance, the driver 63 is implemented by a bolt, and is connected to the bars 61b.

While a user is rotating the bolt 63 in a certain direction, the bars 61b get closer to one another, and lift the pusher 62. On the other hand, while the user is rotating the bolt 63 in the opposite direction, the bars 61b are spaced from one another, and pull down the pusher 62. Thus, the jack 161a varies the distance between the bottom plate 60 and the upper surface of the pusher 62 by the aid of the drier 63.

A user couples the pedal actuator 130 to the grand piano PN as follows. First, a user moves the pedaling aid 101 to the grand piano PN. The user has already pulled down the pusher 62 through the rotation of the driver the opposite direction. The user makes the damper pedal 24 aligned with the window 54, and brings the flat bars 51 into contact with the front surface of the pedal box 22. When the flat bars 51 are brought into contact with the front surface of the pedal box 22, the pusher 62 is inserted into the space under the pedal box 22, and the damper pedal 24 projects into the inner space 32a.

The user slides the movable spacers 52 in the rearward direction until the spacers 52 are brought into contact with the front surface of the lyre post 21. The user tightens the lock bolts 53A AND 53B so that the pedaling aid 101 is located at the proper position with respect to the grand piano PN. When a physically handicapped musician advances the wheelchair to the keyboard KB, the case 132 is still spaced from the case 132 of the pedaling aid 101 at the proper position. Thus, the locator 150 permits the physically handicapped musician to take the optimum attitude toward performance on the grand piano PN.

The user rotates the driver 63 in the certain direction. Then, the jack 161a lifts the pusher 62 toward the lower surface 22b of the pedal box 22. The jack 161a makes the pusher 62 brought into contact with the lower surface 22b. In this situation, the user further rotates the driver 63 in the certain direction. The jack 161a presses the pusher 62 to the lower surface 22b of the pedal box 22 so that the reactive force is exerted on the casters through the jack 161a. Large friction takes place between the casters and the floor 25 so that the coupling device 161 keeps the case 132 stable at the proper position.

The user removes the lower portions of the side boards 32d from the case 132, and inserts his or her hands into the inner space 32a. The user inserts the damper pedal 24 into the socket 46a, and rotates the knob 48 so that the lock bolt 47 presses the damper pedal 24 to the inner surface 46b of the socket 46a. Thus, the damper pedal 24 is coupled through the flexible coupling device 138 to the plunger rod 36 by means of the damper 46. Finally, the user bolts the power portions of the side boards 32a to the case 132.

The movable stoppers 53 may be brought into contact with the front surface of the lyre post 21 after the jack 161a presses the pusher 62 to the lower surface 22b of the pedal box 22. The movable stoppers 53 prevent the case 132 from falling down.

Figure 16:
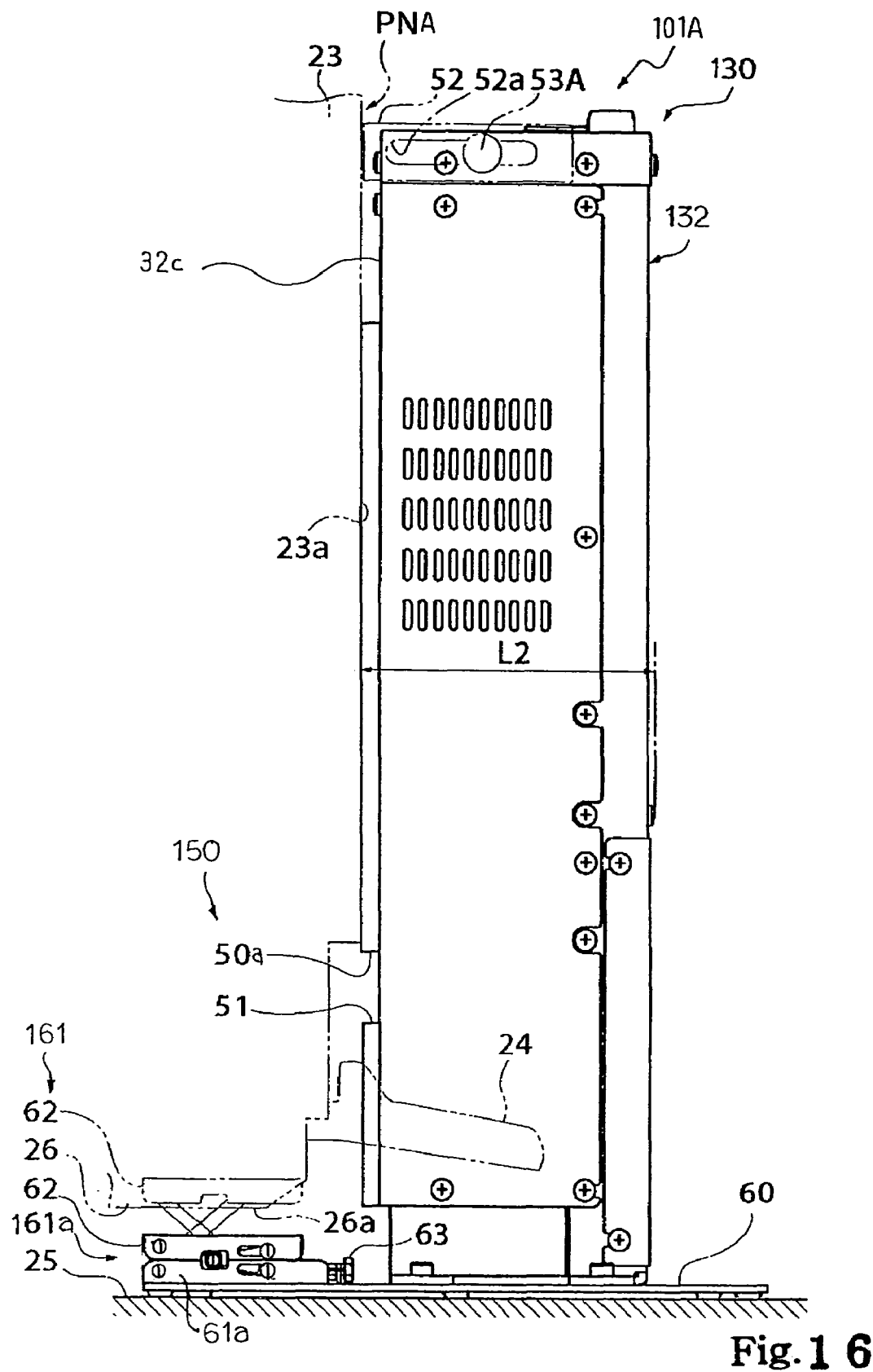
FIG. 16 is a side view showing the external appearance of the pedal actuator combined with an upright piano.

When a user wishes to use the pedaling aid 101 for an upright piano PNA, the user moves the pedaling aid 101 onto the floor 25 in front of the upright piano PNA as shown in FIG. 16. The user has pulled down the pusher 62, and has retracted the movable stoppers 52 into the space on both sides of the side boards 32d. The user slides the case 132 on the floor 25 toward the upright piano PNA, and moves the case 132 into the space under the keyboard.

The user aligns the damper pedal 24 with the window 54, and brings the flat bars 50a into contact with the front surface 23a of the lower front board 23. The user rotates the driver 63 in the certain direction so that the pusher 62 is brought into contact with the lower surface of the bottom board 26. The user further rotates the driver 63, and makes the jack 161a press the pusher 62 to the bottom board 26. Then, the reactive force causes the casters to be pressed to the floor 25. Thus, the locator 150 permits the user to locate the pedal actuator 130 at the proper position under the keyboard, and the coupling device 161 keeps the pedal actuator 130 at the proper position. As a result, a physically handicapped musician does not feel the pedal actuator 130 any obstacle.

Since the rear board 32c is close to the lower front board 23, the case 132 is less liable to fall down. For this reason, the user may keep the movable stoppers 52 retracted. Of course, the user can bring the movable stoppers 52 into contact with front surface of the lower front board 23.

The user removes the lower portions of the side boards 32d from the case 132, and inserts his or her hands into the inner space 32a. The user inserts the damper pedal 24 into the socket 46a, and couples the flexible coupling unit 38 with the damper pedal 24 by means of the coupler 46. Finally, the user bolts the power portions of the side boards 32a to the case 132, again.

Figure 18A:
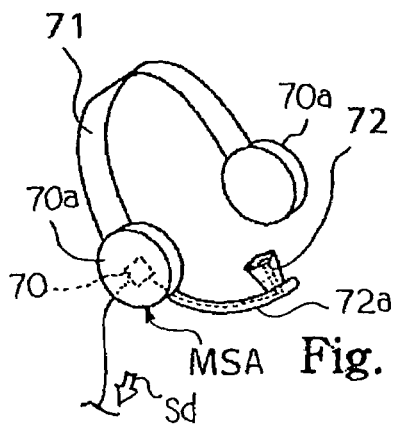
FIG. 18A is a schematic perspective view showing a human interface incorporated in the pedaling aid.
Figure 18B:
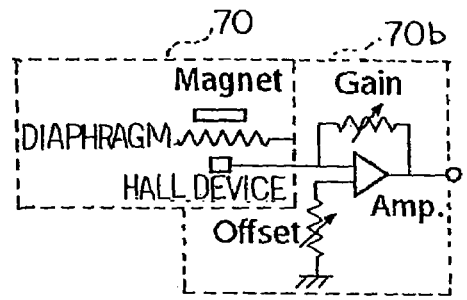
FIG. 18B is a circuit diagram showing a brow sensor incorporated in the human interface.
Figure 19A:
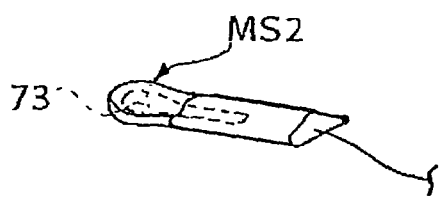
FIG. 19A is a schematic perspective view showing another human interface.
Figure 19B:
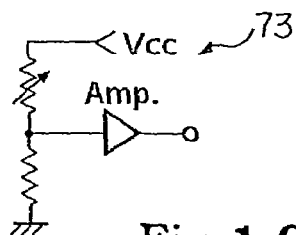
FIG. 19B is a circuit diagram showing the equivalent circuit of the human interface shown in FIG. 19A.
Figure 19C:
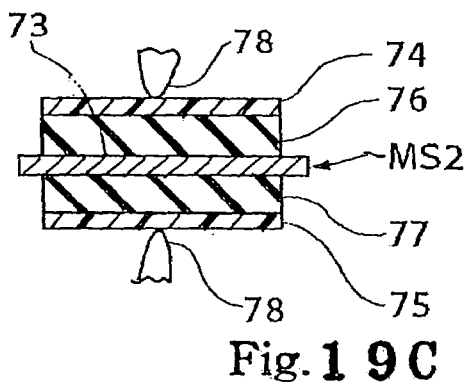
FIG. 19C is a cross sectional view showing the structure of the human interface.
Figure 19D:
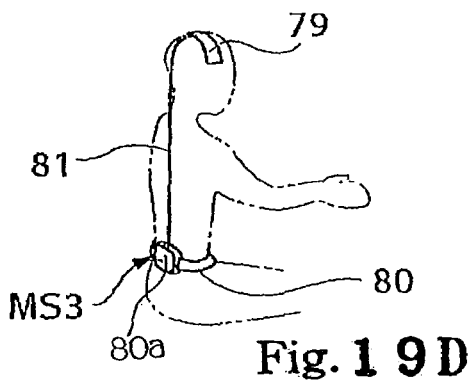
FIG. 19D is a schematic perspective view showing yet another human interface.
Figure 19E:
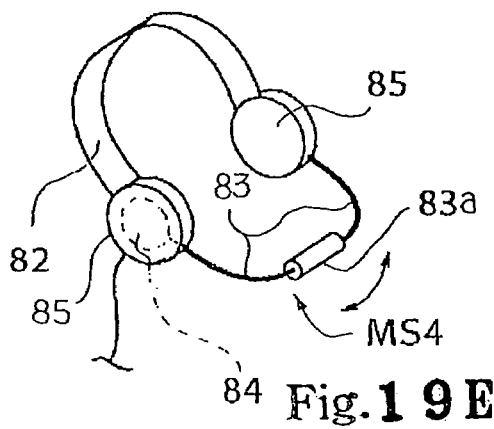
FIG. 19E is a schematic perspective view showing still another human interface.
Figure 19F:
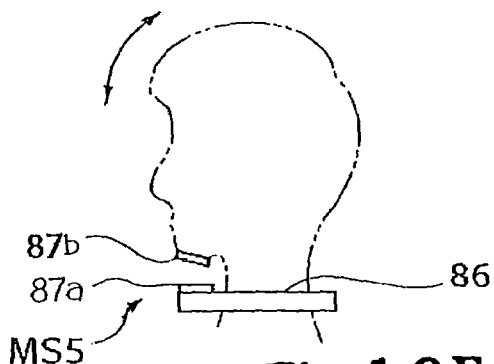
FIG. 19F is a schematic side view showing yet another human interface.
Figure 18C:
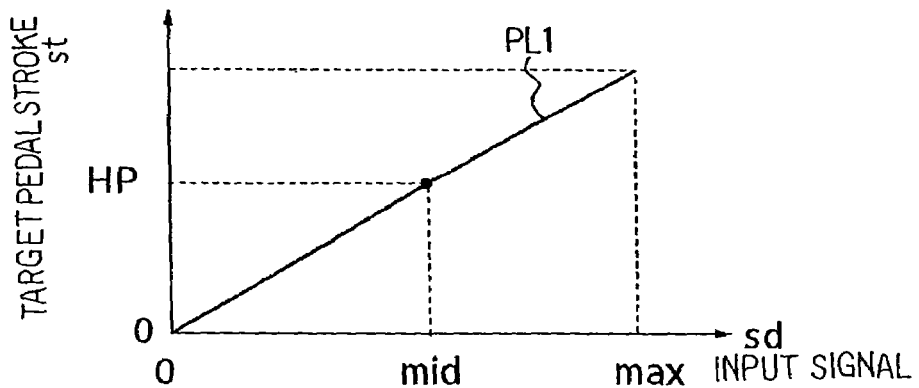
FIG. 18C is a graph showing the relation between the potential level of an input signal produced in the human interface and a target pedal stroke.
Figure 20A:
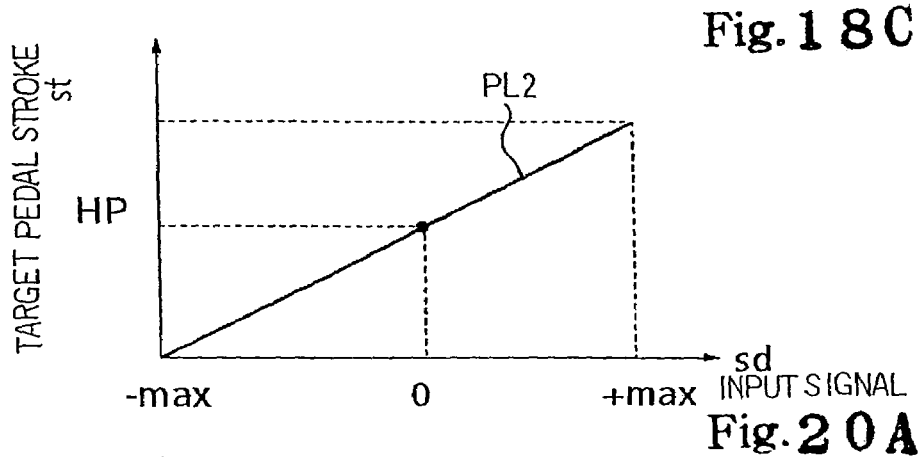
FIG. 20A is a graph showing a relation between the target pedal stroke and the potential level of an input signal of a human interface responsive to both inhalation and exhalation.
Figure 20B:
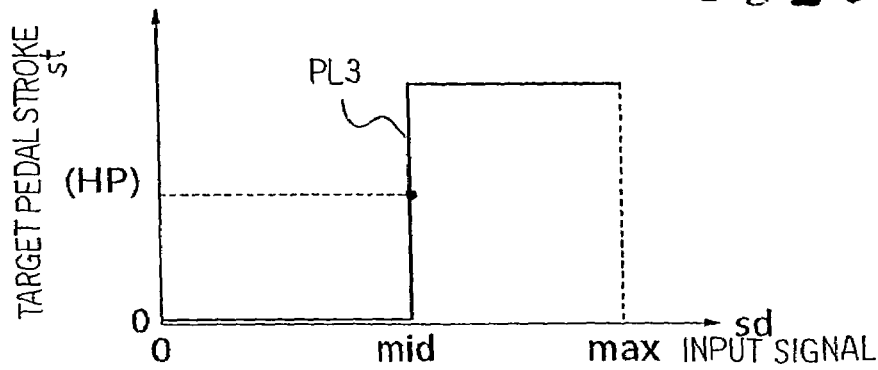
FIG. 20B is a graph showing converting characteristics for bi-stable pedal motion.
Figure 20C:
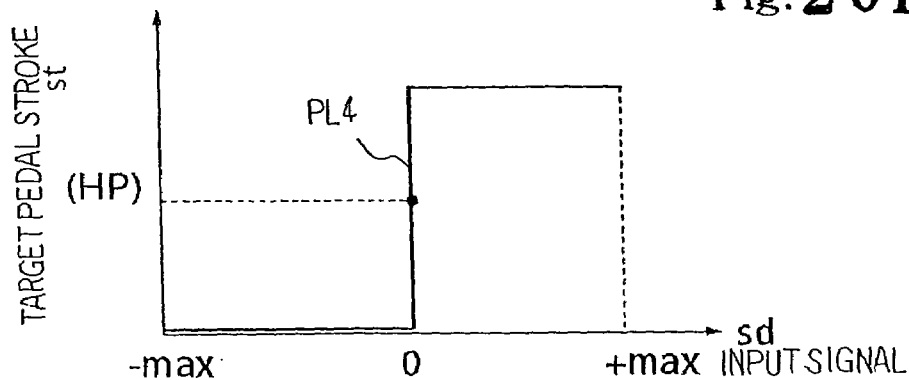
FIG. 20C is a graph showing other converting characteristics for bi-stable pedal motion.
Figure 19G:
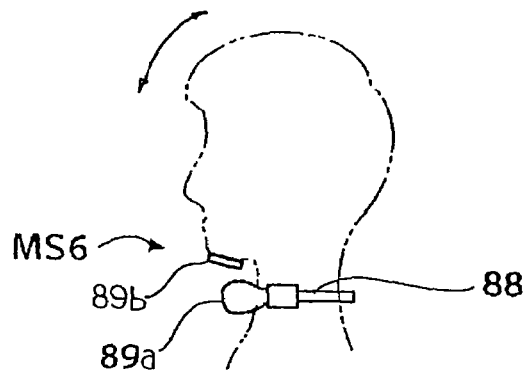
FIG. 19G is a side view showing still another human interface.
Figure 19H:
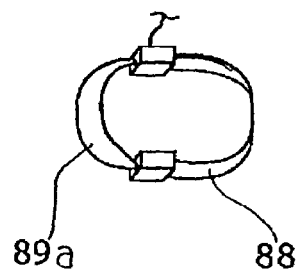
FIG. 19H is a schematic perspective view showing an air bladder forming the part of the human interface shown in FIG. 19G.
Figure 19I:
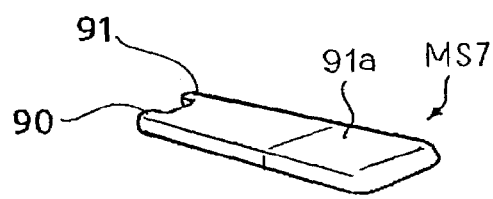
FIG. 19I is a schematic perspective view showing yet another human interface.
Figure 19J:
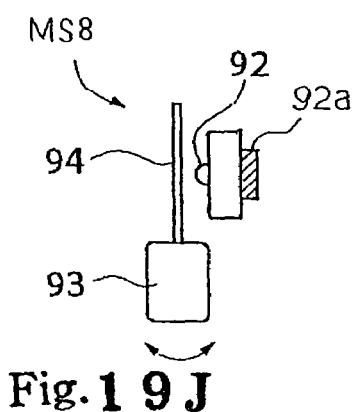
FIG. 19J is a side view showing still another human interface.
Figure 19K:
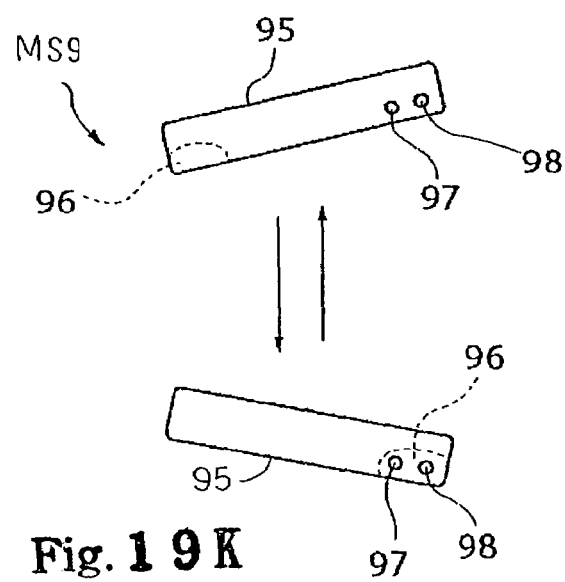
FIG. 19K is a side view showing yet another human interface.

The human interface MSA is similar to the human interface MS as shown in FIGS. 18A and 18B, and the relation shown in FIG. 18C is stored in the read only memory 17. The human interface MS2, MS3, MS4, MS5, MS6, MS7, MS8 and MS9 are available for the pedaling aid 101. However, these human interfaces MS2 to MS9 are similar to those available for the pedaling aid 1 as shown in FIGS. 19A, 19B, 19C, 19D, 19E, 19F, 19G, 19H, 19I, 19J and 19K. For this reason, description on those human interfaces MS2 to MS9 is omitted for avoiding undesirable repetition. The relation shown in FIG. 18C is replaceable with a relation shown in FIGS. 20A, 20B or 20C. The relations shown in FIGS. 20A, 20B and 20C are same as those shown in FIGS. 10A to 10C. No further description is hereinafter incorporated for the sake of simplicity.

A physically handicapped musician is assumed to perform a piece of music on the grand piano PN. The physically handicapped musician or his or her assistant sets the pedaling aid 101A under the keyboard KB, and couples the damper pedal 24 with the plunger rod 36 by means of the flexible coupling unit 138. The physically handicapped musician advances his or her wheelchair to the grand piano PN, and takes the optimum position for the performance. The pedal actuator 130 is still spaced from the footrests of the wheelchair. The physically handicapped musician can finger a piece of music on the keyboard KB as if any pedaling aid 101 is not installed under the keyboard KB.

While the physically handicapped person is fingering the piece of music on the keyboard KB, he or she wishes to prolong the tones in some passages. Then, he or she blows into the mouth piece 72. The air pressure is exerted on the diaphragm, and causes the diaphragm to be deformed. The deformation is converted to the resistance of the Hall device, and the input signal sd is varied in potential level. The input signal sd is sampled and converted to a binary number representative of the target pedal stroke. The central processing unit 11 fetches the pieces of target pedal data from the interface (not shown), and accesses the read only memory 17 with the binary number so as to read out the target pedal stroke from the table shown in FIG. 18C.

The central processing unit 11 determines a target pedal trajectory from the rest position to the target pedal position over the read-out value of the target pedal stroke. The target pedal trajectory is a series of values of the target pedal position. The central processing unit 11 determines a target value of the duty ratio of the driving signal up (t) in order to bring the damper pedal 24 to the first value of the target pedal position. The central processing unit 11 instructs the pedal drive unit 18 to adjust the driving signal up (t) to the first value of the target pedal position.

The pedal drive unit 18 is responsive to the instruction, and adjusts the driving signal up (t) to the first target value. The driving signal up (t) is supplied to the solenoid-operated actuator 134 so that the solenoid-operated actuator 134 downwardly projects the plunger 33b. The plunger 33b exerts the force through the flexible coupling device 138 on the damper pedal 24 by the first value of the target pedal position. The built-in plunger sensor 49 determines the current pedal position on the target pedal trajectory, and informs the controller 131 of the current pedal position through the plunger position signal yp. The plunger position signal yp is sampled and converted to a binary number, and the central processing unit 11 fetches the binary number from the interface3 (not shown).

Figure 17:
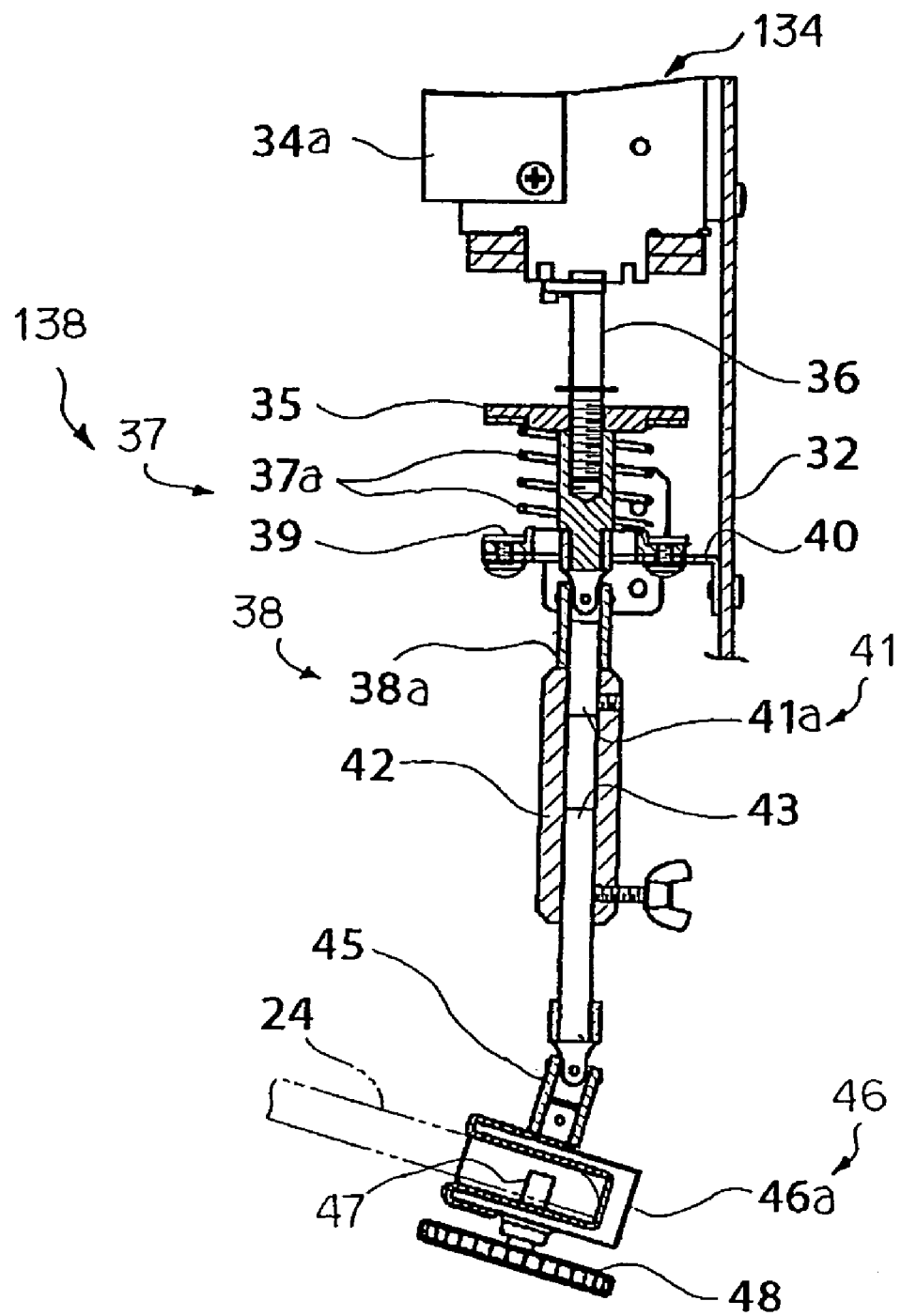
FIG. 17 is a cross sectional side view showing the pedal pressed down by means of the pedal actuator.

The central processing unit compares the current pedal position with the target pedal position to see whether or not the damper pedal 24 exactly travels on the target pedal position. If the answer is positive, the central processing unit 11 informs the pedal drive unit 18 of the next value of the target pedal position. If the answer is negative, the central processing unit 11 instructs the pedal drive unit 18 to increase the duty ratio, and accelerates the pedal motion. Thus, the damper pedal 24 is controlled through the servo control loop. As a result, the damper pedal 24 is forced to travel on the target pedal trajectory. Although the damper pedal 24 is inclined from the rest position, the flexible coupling unit 138 takes up the difference as shown in FIG. 17.

The physically handicapped musician is assumed to decrease the air pressure on the diaphragm. The Hall device varies the potential level of the input signal, and the input signal is sampled and converted to a binary value representative of a new target pedal position in the interface (not shown). The central processing unit 11 fetches the binary value from the interface, and accesses the table in the read only memory 17 with the binary value so as to determine the new target pedal stroke. The central processing unit 11 determines a target pedal trajectory from the previous target pedal position to the new target pedal position.

The central processing unit 11 informs the pedal drive unit 18 of a first value of the new target pedal position on the pedal trajectory, and the pedal drive unit 18 adjusts the driving signal up (t) to the first value. The driving signal up (t) is supplied from the pedal drive unit 18 to the solenoid-operated actuator 134, and the solenoid-operated actuator 134 starts to move the damper pedal to the next target pedal position on the pedal trajectory. The built-in plunger sensor 49 feeds back the plunger position signal yp to the controller 131, and the controller 131 forces the damper pedal 24 to travel on the new target pedal trajectory through the servo control loop.

As will be understood, the physically handicapped musician regulates the air pressure on the diaphragm to any value equivalent to a target pedal position between the rest position and the end position. The pedaling aid 101 according to the present invention is responsive to the input signal representative of the air pressure on the diaphragm exactly so as to bring the damper pedal 24 to any target pedal position between the rest position and the end position. In other words, there are a lot of target pedal positions. When the physically handicapped musician wishes to push down the damper pedal 24 to the half pedal position, he or she adjusts the air pressure to a value equivalent to the half pedal point HP so as make the pedaling aid 101 bring the damper pedal 24 to the half pedal point HP. Thus, the pedaling aid 101 according to the present invention offers a third option, the half pedal state to the physically handicapped musician.

As will be appreciated from the foregoing description, the locator 150 is conducive to the easy and speedy locating work, and the pedaling aid 101 is maintained at the proper position by virtue of the coupling device 161. Thus, the locator 150 and coupling device 161 allow physically handicapped musicians to share the pedaling aid 101 thereamong.

Moreover, the pedaling aid 101 according to the present invention offers the means for imparting various artificial expressions to the acoustic piano tones, and prevents the physically handicapped musician from falling down the chair. Thus, the pedaling aid 101 according to the present invention achieves the advantages of the first embodiment.

Modifications

Although the particular embodiment of the present invention has been shown and described, it will be apparent to those skilled in the art that various changes and modifications may be made without departing from the spirit and scope of the present invention.

First, the changes of the first embodiment and modifications are appropriate for the second embodiment.

The coupling device 61 may be implemented by another mechanism such as a cam mechanism. In this instance, while the pedaling aid is moved on the floor, the minor axis is directed in the up-and-down direction. When the user couples the pedaling aid to a keyboard musical instrument, the cam is rotated over 90 degrees, and the major axis is directed in the up-and-down direction. Otherwise, a hydraulic pressure is available for the coupling device.

In case where the casters are used in the base, brakes may be provided in association with the casters. In this instance, the brakes on the casters serve as a coupling device.

A male coupler and a female coupler may be used for the coupling between a piano and a pedaling aid.

Claim languages are correlated with the component parts of the embodiments as follows. The grand piano PN or upright piano PNA is corresponding to a "musical instrument". The mouth, teeth, tongue, head or chin serves as an "organ of the body of a physically handicapped musician except those of the trunk of the body". The elbow and shoulder are other "organs of the body of a physically handicapped musician except those of the trunk of the body".

The solenoid-operated actuator 34/134 and flexible coupling device 38/138 as a whole constitute an "actuator", and the case 32/132 serves as a "supporting frame". A physically handicapped musician and an assistant for the physically handicapped musician are corresponding to a "user".

What is claimed is:

1. A pedaling aid for a physically handicapped musician, comprising:
   a pedal actuator associated with a pedal of a musical instrument, and responsive to a driving signal so as to drive said pedal to move between a rest position and an end position;
   a human interface manipulated by said physically handicapped musician with an organ of the body of said physically handicapped musician except those of the trunk of said body for producing an input signal representative of an intention of said musically handicapped musician, and having a variable resistor converting a position of the head of said physically handicapped musician to produce said input signal, said variable resistor varying the resistance against electric current depending upon the position of said head; and
   a controller connected to said pedal actuator and said human interface, and responsive to said input signal so as to produce said driving signal.

2. A pedaling aid for a physically handicapped musician, comprising:
   a pedal actuator associated with a pedal of a musical instrument, and responsive to a driving signal so as to drive said pedal to move over a target pedal stroke on a trajectory between a rest position and an end position;
   a human interface manipulated by said physically handicapped musician for producing an input signal representative of said target pedal stroke; and
   a controller connected to said pedal actuator and said human interface, responsive to said input signal so as to determine said target pedal stroke on the basis of said input signal, and adjusting said driving signal to a magnitude equivalent to said target pedal stroke.

3. The pedaling aid as set forth in claim 2, in which a relation between a magnitude of said input signal and said target pedal stroke is stored in said controller so as to read said target pedal stroke in said relation.

4. The pedaling aid as set forth in claim 2, in which said input signal has a magnitude varied in a predetermined polarity so that the minimum value of said target pedal stroke, maximum value of said target pedal stroke and values of said target pedal stroke between said minimum value and said maximum value are mapped with different values in said predetermined polarity.

5. The pedaling aid as set forth in claim 2, in which said input signal has a magnitude varied partially in a polarity and partially in the opposite polarity so that the minimum value of said target pedal stroke, maximum value of said target pedal stroke and values of said target pedal stroke between said minimum value and said maximum value are mapped with different values in both of the polarities.

6. The pedaling aid as set forth in claim 2, in which said magnitude is indicative of one of the potential level, time period and the number of switching actions.

7. A pedaling aid for a physically handicapped musician, comprising:
   a pedal actuator associated with a pedal of a musical instrument, and including an actuator responsive to a driving signal so as to drive said pedal to move between a rest position and an end position, a supporting frame for bearing said actuator and a coupling device for keeping said supporting frame at a proper position with respect to said musical instrument;
   a human interface manipulated by said physically handicapped musician for producing an input signal representative of an intention of said musically handicapped musician; and
   a controller connected to said pedal actuator and said human interface, and responsive to said input signal so as to produce said driving signal.

8. The pedaling aid as set forth in claim 7, in which said pedal actuator further includes a locator assisting a user in locating said supporting frame at said proper position.

9. The pedaling aid as set forth in claim 7, in which said musical instrument is an acoustic piano.

* * * * *